(12) United States Patent
Tsutsui et al.

(10) Patent No.: US 9,127,148 B2
(45) Date of Patent: Sep. 8, 2015

(54) MODIFIED POLYSTYRENE RESIN PARTICLES AND MANUFACTURING METHOD THEREFOR, EXPANDABLE PARTICLES AND MANUFACTURING METHOD THEREFOR, PRE-EXPANDED PARTICLES, AND EXPANDED MOLDED ARTICLE

(75) Inventors: Yasutaka Tsutsui, Shiga (JP); Shingo Terasaki, Shiga (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 47 days.

(21) Appl. No.: 13/876,239

(22) PCT Filed: Sep. 30, 2011

(86) PCT No.: PCT/JP2011/072560
§ 371 (c)(1),
(2), (4) Date: Mar. 27, 2013

(87) PCT Pub. No.: WO2012/043792
PCT Pub. Date: Apr. 5, 2012

(65) Prior Publication Data
US 2013/0184363 A1  Jul. 18, 2013

(30) Foreign Application Priority Data

Sep. 30, 2010  (JP) .................................. 2010-222297

(51) Int. Cl.
*C08L 25/06* (2006.01)
*C08L 33/08* (2006.01)
(Continued)

(52) U.S. Cl.
CPC . *C08L 25/06* (2013.01); *C08F 2/44* (2013.01); *C08F 257/02* (2013.01); *C08L 33/08* (2013.01);
(Continued)

(58) Field of Classification Search
CPC ................... C08J 9/16; C08J 9/18; C08J 9/20
See application file for complete search history.

(56) References Cited

U.S. PATENT DOCUMENTS 5,756,573 A    5/1998  Trumbo et al.
6,221,926 B1 *  4/2001  Oohara et al. .................. 521/59
(Continued)

FOREIGN PATENT DOCUMENTS

CN    103415559    11/2013
JP    56-67344     6/1981
(Continued)

OTHER PUBLICATIONS

Thomson Reuters. "Manufacture of foamable polystyrene-resin particles for foam molded products, involves impregnating foaming agent to polystyrene resin particles which are formed using styrenic monomer, acrylic ester monomer and seed particles". Derwent abstract of WO 2009096327 by Aramomi et al.*
(Continued)

*Primary Examiner* — Randy Gulakowski
*Assistant Examiner* — Christina Wales
(74) *Attorney, Agent, or Firm* — Greenblum & Bernstein, P.L.C.

(57) ABSTRACT

Modified polystyrene-based resin particles comprising polyacrylic acid ester-based resin microparticles having an average particle diameter in the range of from 30 to 1,000 nm being dispersed in polystyrene-based resin particles, such that the polyacrylic acid ester-based resin microparticles are present (1) in the area ratio of from 0.1 to 15% in a surface area, which includes areas up to 20 μm from the surface of each resin particle, and (2) present in the area ratio of from 11 to 50% in the inner area, which includes the area between the center of each resin particle and an point 30% of the radius from the center of each particle.

20 Claims, 10 Drawing Sheets

(a)

(b)

(51) Int. Cl.
*C08F 2/44* (2006.01)
*C08F 257/02* (2006.01)
*C08J 9/16* (2006.01)

(52) U.S. Cl.
CPC ............... *C08J 9/16* (2013.01); *C08L 2203/14* (2013.01); *C08L 2205/22* (2013.01); *Y10T 428/2982* (2015.01)

(56) References Cited

U.S. PATENT DOCUMENTS

2006/0217452 A1    9/2006  Inada et al.
2007/0059511 A1*   3/2007  Edwards et al. ........... 428/304.4
2013/0310475 A1   11/2013  Tsutsui et al.

FOREIGN PATENT DOCUMENTS

| JP | 10-120861 | 5/1988 |
| JP | 03-182529 | 8/1991 |
| JP | 2841303 | 12/1998 |
| JP | 11-152364 | 6/1999 |
| JP | 11-512774 | 11/1999 |
| JP | 2002-139183 | 5/2002 |
| JP | 4101379 | 6/2008 |
| JP | 2011-68817 | 4/2011 |
| JP | 2011068817 A * | 4/2011 |
| JP | 5284987 B2 * | 9/2013 |
| TW | 200516103 | 5/2005 |
| WO | 2009/096327 | 8/2009 |
| WO | WO 2009096327 A1 * | 8/2009 |

OTHER PUBLICATIONS

Translation of JP5284987 by Aramomi et al. 2013.*
Extended European Search Report for EP Application No. 11829345.5, dated Feb. 19, 2014.
Japanese Office Action in regard to Japanese Application No. 2012-536580 dated Aug. 6, 2013.
English translation of the International Search Report for International Patent Application No. PCT/JP2011/072560, mailed on Jan. 17, 2012.

* cited by examiner (a)   (b)

(a)  (b)

(a)  (b)

(a)        (b)

(a)        (b)

(a)          (b)

(a)          (b)

(a) (b)

(a) (b)

(a) (b)

(a) (b)

(a) (b)

(a) (b)

(a)          (b)

(a)          (b)

(a)              (b)

(a)              (b)

MODIFIED POLYSTYRENE RESIN PARTICLES AND MANUFACTURING METHOD THEREFOR, EXPANDABLE PARTICLES AND MANUFACTURING METHOD THEREFOR, PRE-EXPANDED PARTICLES, AND EXPANDED MOLDED ARTICLE

TECHNICAL FIELD

The present invention is related to modified polystyrene-based resin particles and a method of manufacturing the same, expandable particles and a method for manufacturing the same, pre-expanded particles, and an expanded molded article. The present invention can provide polystyrene-based resin particles that have excellent moldability and can yield an expanded molded article having excellent impact resistance.

BACKGROUND TECHNOLOGY

Expanded molded articles made of polystyrene-based resin exhibit excellent cushioning and thermal insulation properties and can easily be molded, and thus they are widely used as packaging materials or thermal insulating materials. However, since their impact resistance and resilience are insufficient, there has been a problem in that they are prone to generating cracks and chips easily and thus s are not suitable for packaging, for example, of precision equipment and the like.

On the other hand, expanded molded articles made of polypropylene-based resin exhibit excellent impact resistance and resilience, but require heavy equipment and facilities when molded. Further, the polypropylene-based resin due to its inherent properties, needs to be transported from a raw material manufacturer to a molder in the form of expanded particles. Thus, there has been a problem in that the bulky shipment of such expanded particles leads to an increase in manufacturing costs thereof.

Recently, a rubber-modified styrene-based resin expanded molded article has been proposed that exhibits improved impact resistance and resilience, as well as can be easily molded compared to expanded articles made of polystyrene-based resin, or in other words an expanded molded article made of high impact polystyrene resin (hereinafter referred to as "HIPS") in which an elastic component such as butadiene rubber is formulated into polystyrene-based resin, has been proposed (for example, refer to Japanese Unexamined Patent Application, First Publication No. S56-67344 (Patent Document 1), Japanese Patent No. 2841303 (Patent Document 2), Japanese Patent No. 4101379 (Patent Document 3), and Japanese Unexamined Patent Application, First Publication No. H03-182529 (Patent Document 4).

For example, Patent Document 1 discloses expanded particles with improved impact resistance made of a resin in which non-orientable rubber particles are dispersed in polystyrene.

However, since the rubber particles are non-orientable, the rubber particles do not readily deform thereby to break-through the membrane of cells inside the thin cell structure of the expanded article. In particular, with pre-expanded particles having a high expansion ratio, there has been a problem in that the retention of the blowing agent gas is insufficient due to said break-through of the rubber particles.

Patent Document 2 discloses an expanded article of a resin in which HIPS and a hydrogenated styrene-butadiene block copolymer are mechanically mixed.

However, since such an expanded article contains a rubber component mechanically mixed, there has been a problem in that if the dispersion of the mixed rubber component is insufficient, the dispersion of the rubber component in the cell membranes of the expanded article becomes uneven inhomogeneous and such cells tends to be broken and opened through readily. This tendency is often seen particularly when the resin is highly expanded, where the expandability of the highly expanded particles is reduced and gaps may be produced between the particles of the expanded molded article, thus resulting in an unfavorable appearance of the expanded molded article. Further, while the impact resistance of said expanded molded article is improved compared to that of a conventional polystyrene-based expanded molded article, it is still not at a practically sufficient level.

PRIOR ART DOCUMENTS

Patent Documents

Patent Document 1: Japanese Unexamined Patent Application, First Publication No. S56-67344
Patent Document 2: Japanese Patent No. 2841303
Patent Document 3: Japanese Patent No. 4101379
Patent Document 4: Japanese Unexamined Patent Application, First Publication No. H03-182529

SUMMARY OF THE INVENTION

Problem to be Solved by the Invention

HIPS is a polystyrene-based resin with improved impact resistance. Nevertheless, the impact resistance of the polystyrene-based resin expanded molded articles disclosed in the above-described prior art is not at a practically sufficient level. It is presumed that this insufficient level is attributable to the fact that the formulated elastic component, such as butadiene rubber, is present uniformly through the surface area and the center of the expandable polystyrene-based resin particles, when expandable polystyrene-based resin particles are made of HIPS. In other words, it is presumed that the pre-expanded particles, obtained by heating and pre-expanding said expandable polystyrene-based resin particles, have a surface area of which cell membranes are prone to breaking due to the presence of the elastic component, and so do not fuse each other adequately when filled into the cavity of a mold, heated and molded into an expanded molded article.

Thus, an object of the present invention is to solve the above-described problem by providing polystyrene-based resin particles that have excellent moldability and can yield an expanded molded article having excellent impact resistance and a method of producing the same, expandable polystyrene-based resin particles, pre-expanded particles, and an expanded molded article.

Means for Solving the Problem

As a result of keen investigation in order to achieve the above-described object, the present inventors discovered the following unexpected findings to reach the present invention, i.e., the polystyrene-based resin particles that have excellent moldability and can yield an expanded molded article having excellent impact resistance can be obtained by having the microparticles of polyacrylic acid ester-based resin present in the inner area of said polystyrene-based resin particles, instead of having them be dispersed throughout the entirety of said polystyrene-based resin particles; in other words, the inner area in which the microparticles of polyacrylic acid ester-based resin are dispersed is contained either by polystyrene-based resin having no microparticles of polyacrylic acid ester-based resin present therein or by polystyrene-based resin having the microparticles of polyacrylic acid ester-based resin present in the amount less than those dispersed in the inner area.

The combination of polystyrene-based resin and polyacrylic acid ester-based resin, where the microparticles of polyacrylic acid ester-based resin are dispersed in the polystyrene-based resin particles, has not been known.

The known combination of polystyrene-based resin and butadiene rubber is a homogeneous mixture, as the both need to be mixed in the state of polymers. However, in the mixture of polyacrylic acid ester-based resin and polystyrene-based resin of the present invention, the two resins can be dispersed inhomogeneously because polyacrylic acid ester-based monomer is impregnated into the polystyrene-based resin for polymerization therein.

Thus, according to the present invention, modified polystyrene-based resin particles are provided, in which polyacrylic acid ester-based resin microparticles having an average particle diameter in the range of from 30 to 1,000 nm are dispersed in said polystyrene-based resin particles, such that said microparticles of polyacrylic acid ester-based resin (1) are present in the area ratio of from 0.1 to 15% in the surface area, including an area up to 20 μm from the surface of each particle, and (2) are present in the area ratio of from 11 to 50% in the inner area, including the area between the center of each particle and a point 30% of the radius from the center of each particle.

According to the present invention, expandable particles that comprise the above-described modified polystyrene-based resin particles and a volatile blowing agent are provided.

Furthermore, according to the present invention, pre-expanded particles obtained by pre-expanding the above-described expandable particles are provided.

Further, according to the present invention, an expanded molded article obtained by expanding and molding the above-described pre-expanded particles is provided.

Even further, according to the present invention, a method of manufacturing the above-described modified polystyrene-based resin particles is provided, comprising the following steps:

at least impregnating in an aqueous medium the seed particles of polystyrene-based resin with acrylic acid ester-based monomer, and then having the acrylic acid ester-based monomer polymerized, thereby to have the microparticles of polyacrylic acid ester-based resin formed and dispersed in said seed particles; and subsequently in said aqueous medium at least impregnating styrene-based monomer into the seed particles, in which the microparticles of polyacrylic acid ester-based resin are formed and dispersed, and then having the styrene-based monomer polymerized, thereby to grow the polystyrene-based resin particles.

According to the present invention, a method of manufacturing the above-described expandable particles is provided, comprising the following steps:

at least impregnating in an aqueous medium the seed particles of polystyrene-based resin with acrylic acid ester-based monomer, and then having the acrylic acid ester-based monomer polymerized, thereby to have the microparticles of polyacrylic acid ester-based resin formed and dispersed in said seed particles; and subsequently in said aqueous medium at least impregnating styrene-based monomer into the seed particles, in which the microparticles of polyacrylic acid ester-based resin are formed and dispersed, and then having the styrene-based monomer polymerized, thereby to grow the polystyrene-based resin particles; and impregnating said polystyrene-based resin particles with a volatile blowing agent either after or during the step of growing the polystyrene-based resin particles.

Effects of the Invention

According to the present invention, polystyrene-based resin particles that have excellent moldability and yield an expanded molded article having excellent impact resistance and a method of manufacturing the same, expandable polystyrene-based resin particles, pre-expanded particles, and an expanded molded article can be provided.

More specifically, the modified polystyrene-based resin particles of the present invention have an area consisting of polystyrene-based resin in which the microparticles of polyacrylic acid ester-based resin are dispersed, and have a structure in which there are fewer microparticles of polyacrylic acid ester-based resin distributed in the surface area than in the inner area thereof. As a result of this structure, when a volatile blowing agent is incorporated into said modified polystyrene-based resin particles to obtain expandable particles, then the resulting expandable particles are heated and pre-expanded, then the resulting pre-expanded particles are filled into the cavity of a mold, heated, and expanded and molded in the mold in order to produce an expanded molded article, the impact resistance of the expanded molded article can be improved with the expanded particles fused to a high degree. Therefore, an expanded molded article exhibiting excellent mechanical strength, moldability, and impact resistance can be provided.

The modified polystyrene-based resin particles of the present invention exhibit the above-described effects further, provided that:

(i) (1) the absorbance ratio X (D1730/D1600) of a surface area is 2 or more lower than the absorbance ratio (D1730/D1600) of a point between the center of each resin particle and point 30% of the radius from the center of each resin particle (D1730 and D1600 refer to the absorbance taken at 1730 $cm^{-1}$ and the absorbance taken at 1600 $cm^{-1}$ on an infrared absorption spectrum by infrared spectroscopic analysis);

(2) the absorbance ratio Y (D1730/D1600) of an inner area is 4 or more at least in the entire region between the center of each resin particle and a point 30% of the radius from the center of each resin particle;

(ii) the modified polystyrene-based resin particles have at least an area, where the absorbance ratio Y (D1730/D1600) is 4 or more, being present between a point that is 30% of the radius from the center of each resin particle and a point that is 98% of the radius from the center of each resin particle;

(iii) (1) the absorbance ratio X (D1730/D1600) of the surface area is less than 6 (D1730 and D1600 refer to the absorbance at 1730 $cm^{-1}$ and the absorbance at 1600 $cm^{-1}$ in an infrared absorption spectrum by infrared spectroscopic analysis);

(2) the absorbance ratio Y (D1730/D1600) of the inner area is 6 or more at least in the entire region between the center of each resin particle and a point 30% of the radius from the center of each resin particle;

(iv) the modified polystyrene-based resin particles have at least an area, where the absorbance ratio Y (D1730/D1600) is 6 or more, between a point that is 30% of the radius from the center of each resin particle and a point that is 98% of the radius from the center of each resin particle;

(v) the polyacrylic acid ester-based resin microparticles are formed by polymers of ethyl acrylate, butyl acrylate, 2-ethylhexyl acrylate, or a mixture thereof;

(vi) the polyacrylic acid ester-based resin microparticles have an average particle diameter in the range of from 200 to 500 nm;

(vii) the polystyrene-based resin particles have a surface area exhibiting the absorbance ratio X of 3 or less and at least an area exhibiting the absorbance ratio Y (D1730/D1600) of 6 or more being present between a point that is 30% of the radius from the center of each resin particle and a point that is 90% of the radius from the center of each resin particle;

(viii) the modified polystyrene-based resin particles have a surface area exhibiting the absorbance ratio X of 3 or less and at least an area exhibiting the absorbance ratio Y (D1730/D1600) of 6 or more between a point that is 30% of the radius from the center of each resin particle and a point that is 50% of the radius from the center of each resin particle;

(ix) the modified-polystyrene-based resin particles have an average particle diameter in the range of from 0.3 to 2 mm; or (x) the modified polystyrene-based resin particles contain a component derived from polybutadiene-terminated acrylate.

The above-described excellent effects are further exhibited, provided that, in the expandable particles, the volatile blowing agent is a volatile blowing agent comprises pentane as a main component, and the content thereof is from 2 to 10% by weight relative to the expandable particle.

Also, according to the method for manufacturing the modified polystyrene-based resin particles and the method for manufacturing the expandable particles of the present invention, modified polystyrene-based resin particles and expandable particles can be prepared efficiently and at low cost; and can be used for manufacturing an expanded molded article exhibiting excellent mechanical strength, moldability, and impact resistance as described above.

BEST MODE FOR CARRYING OUT THE INVENTION

Figure 1:
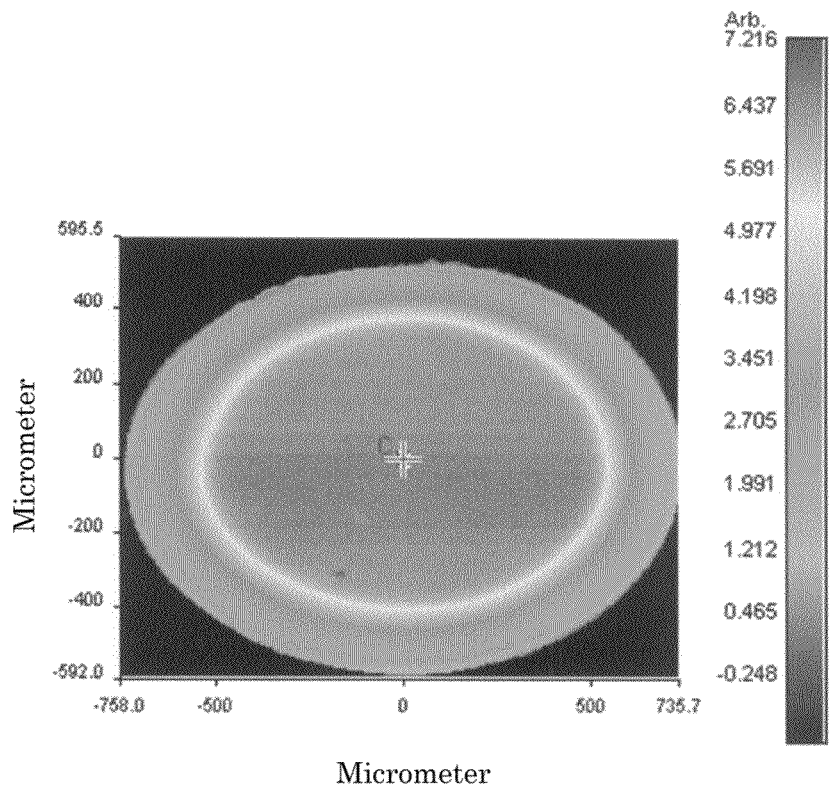
FIG. 1 is a mapping image of the polystyrene-based resin particles of Example 6.

The modified polystyrene-based resin particles (hereinafter also referred to as "modified particles") of the present invention has polyacrylic acid ester-based resin microparticles (hereinafter also referred to as "microparticles") of the average particle diameter in the range of from 30 to 1,000 nm dispersed therein, and the microparticles are more concentrated (biased) in the inner area (center part) than the surface area (surface layer).

In other words, the modified particles have a structure comprising the inner area, in which the microparticles are dispersed, being contained either by polystyrene-based resin having no microparticles present therein or by polystyrene-based resin having the microparticles in the amount less than those dispersed in the inner area.

The microparticles may have a so-called "salami structure," where polymerized styrene is present within the microparticle.

(Polystyrene-Based Resin Particles)

The polystyrene-based resin constituting the polystyrene-based resin particles is not particularly limited as long as it is a resin whose main component is styrene-based monomers, examples include, styrene or a styrene derivative alone or copolymerized.

As the styrene derivative, examples include, α-methylstyrene, vinyltoluene, chlorostyrene, ethylstyrene, isopropylstyrene, dimethylstyrene, bromostyrene, and the like. These styrene-based monomers can be used alone or in combination.

The polystyrene-based resin can also comprise a vinyl-based monomer that can copolymerize with a styrene-based monomer.

As such a vinyl-based monomer, examples include, a multifunctional monomer such as a divinylbenzene such as o-divinylbenzene, m-divinylbenzene, and p-divinylbenzene, an alkylene glycol di(meth)acrylate such as ethylene glycol di(meth)acrylate and polyethylene glycol di(meth)acrylate, and the like; α-methylstyrene, (meth)acrylonitrile, methyl (meth)acrylate, butyl (meth)acrylate, and the like. Among these, a multifunctional monomer is preferred, and ethylene glycol di(meth)acrylate, polyethylene glycol di(meth)acrylate having an ethylene unit number of from 4 to 16, and divinylbenzene are more preferred, and divinylbenzene and ethylene glycol di(meth)acrylate are particularly preferred. The monomers can be used alone or in combination.

When using the monomers in combination, it is preferable to set the content thereof so that the styrene-based monomer becomes the main component (for example, 50% by weight or more).

In the present invention, "(meth)acryl" means "acryl" or "methacryl".

(Polyacrylic Acid Ester-Based Resin Microparticles)

The polyacrylic acid ester-based resin constituting the microparticles is not particularly limited as long as it is a resin whose main component is acrylic acid ester-based monomers. For example, methyl acrylate, ethyl acrylate, propyl acrylate, butyl acrylate, pentyl acrylate, 2-ethylhexyl acrylate, hexyl acrylate, and the like can be used. Among these, ethyl acrylate, butyl acrylate, and 2-ethylhexyl acrylate are preferred. These acrylic acid ester-based monomers can be used alone or in combination.

Therefore, the microparticles are preferably formed by polymers of ethyl acrylate, butyl acrylate, 2-ethylhexyl acrylate, or a mixture thereof.

The microparticles exist in a specific area ratio in a surface area and an inner area of each modified particle. Herein, the surface area indicates a region from the particle surface down to a depth of 20 μm, and the inner area indicates a region from the center out to 30% of the radius. The method for measuring the area ratio will be explained in the Examples section.

The specific area ratios are as follows: from 0.1 to 15% in the surface area, and from 11 to 50% in the inner area.

If the area ratio is less that 0.1% in the surface area, the impact resistance of the expanded molded article obtained from the modified particles may be insufficient. If it is more than 15%, the expanded molded article obtained from the modified particles may constrict or the surface thereof may melt, leading to a bad outer appearance.

If the area ratio is less than 11% in the inner area, the impact resistance of the expanded molded article obtained from the modified particles may be insufficient. If it is more than 50%, the expandability of the expandable polystyrene-based resin particles may decrease.

The area ratio in the surface area is preferably from 0.1 to 15%, and more preferably from 1.1 to 11%. The area ratio in the inner area is preferably from 11 to 50%, and more preferably from 11.1 to 45%.

Further, the area ratio in the inner area is preferably from 1.1 to 100 times larger than the area ratio in the surface area region. Due to this area ratio relationship, an expanded molded article exhibiting excellent mechanical strength, moldability, and impact resistance can be provided. The area ratio in the inner area is more preferably from 1.1 to 20 times larger than the area ratio in the surface area region.

Next, the microparticles are preferably dispersed in the modified particles in a state characterized by the following specific absorbance ratios in the infrared absorption spectrum.

(1) Absorbance Ratio of Surface Area

The modified particles preferably have a relationship in which the absorbance ratio X (D1730/D1600) of 1730 $cm^{-1}$ and 1600 $cm^{-1}$ obtained from the infrared absorption spectrum obtained by measuring the surface area of the modified particle by infrared spectroscopic analysis is 2 or more lower than the absorbance ratio (D1730/D1600) at a point that is 30% of the radius from the center. The surface area comprises a region from the particle surface to a depth of several micrometers (for example, 2 μm). This relationship indicates a distribution structure in which there are few microparticles in the particle surface area and the microparticles are comprised inside the particle. Due to this absorbance ratio relationship, an expanded molded article exhibiting excellent mechanical strength, moldability, and impact resistance can be provided.

The absorbance ratio of the modified particles can be any ratio as long as the surface area and the point that is 30% of the radius from the center satisfy the above-described relationship. The absorbance ratio of the modified particles preferably gradually decreases from the center toward the surface area. Such a gradual decrease is referred to as an inclined structure.

The absorbance ratio X is preferably less than 6, and more preferably less than 4.

If the absorbance ratio X is 4 or more (or 6 or more), the ratio of the microparticles in the surface area increases but the ratio of the polystyrene-based resin particles conversely decreases. As a result, as will be explained later, the surface of the expanded molded article may melt which leads to a bad outer appearance, and the expanded molded article may constrict which also leads to a bad outer appearance.

Herein, infrared spectroscopic analysis in the present invention is an analysis method in which the infrared absorption spectrum is measured by a single reflection-type ATR method using Attenuated Total Reflectance (ATR). In this analysis method, an ATR prism having a high refractive index is adhered to a sample, infrared rays are irradiated on the sample through the ATR prism, and the light emitted from the ATR prism is analyzed by spectroscopy.

Infrared spectroscopic analysis by the ATR method is widely used in surface analysis of various substances such as organic substances like polymeric materials because it is simple in that the spectrum can be measured by merely adhering an ATR prism to a sample and the surface can be analyzed down to a depth of several micrometers.

The absorbance D1730 at 1730 $cm^{-1}$ obtained from the infrared absorption spectrum corresponds to an absorption spectrum derived from the stretching vibration between C=O of the ester group comprised in the above-described ester. In the measurement of this absorbance, peak separation is not carried out even if another absorption spectrum is overlapping at 1730 $cm^{-1}$. The absorbance D1730 indicates the maximum absorbance between 1680 $cm^{-1}$ and 1785 $cm^{-1}$ with the straight line connecting 1680 $cm^{-1}$ and 1785 $cm^{-1}$ as a baseline.

The absorbance D1600 at 1600 $cm^{-1}$ obtained from the infrared absorption spectrum corresponds to an absorption spectrum derived from the in-plane vibration of a benzene ring comprised in the polystyrene-based resin. In the measurement of this absorbance, peak separation is not carried out even if another absorption spectrum is overlapping at 1600 $cm^{-1}$. The absorbance D1600 indicates the maximum absorbance between 1565 cm$^{-1}$ and 1640 cm$^{-1}$ with the straight line connecting 1565 cm$^{-1}$ and 1640 cm$^{-1}$ as a baseline.

(2) Relationship Between Absorbance Ratios of Surface Area and Center Part

The modified particles preferably have a center part exhibiting an absorbance ratio Y (D1730/D1600) of 4 or more in at least the entire region from the center out to a point that is 30% of the radius. This means that the microparticles are more concentrated (localized) in the center part than in the surface area.

If the absorbance ratio Y in the entire region from the center out to a point that is 30% of the radius is not 4 or more, the impact resistance of the obtained expanded molded article may be insufficient.

The modified particles more preferably have at least one part where the absorbance ratio Y (D1730/D1600) is 4 or more between a point that is 30% of the radius from the center and a point that is 98% of the radius from the center. If a region that exhibits an absorbance ratio Y of 4 or more is beyond a point that is 98% of the radius from the center and thus is comprised on the surface area side, when expanding and molding the obtained pre-expanded particles in a mold to produce an expanded molded article, the surface of the obtained expanded molded article may melt which leads to a bad outer appearance, and the expanded molded article may constrict which also leads to a bad outer appearance.

A part that exhibits an absorbance ratio Y of 4 or more preferably exists adjacent to a point that is 30% of the radius from the center. For example, the absorbance ratio can have a distribution curve in which it gradually decreases from a point that is 30% of the radius from the center at which it is 4 or more toward the surface area such that it becomes less than 4 at a point beyond 50%, 90%, or 98% from the center.

The absorbance ratio Y is more preferably 6 or more. Further, the modified particles more preferably have at least one part where the absorbance ratio Y (D1730/D1600) is 6 or more between a point that is 30% of the radius from the center and a point that is 98% of the radius from the center.

The modified particles preferably have a surface area exhibiting an absorbance ratio X of 3 or less and at least one part where the absorbance ratio Y (D1730/D1600) is 6 or more between a point that is 30% of the radius from the center and a point that is 50% of the radius from the center. Further, the modified particles more preferably have a surface area exhibiting an absorbance ratio X of 3 or less and at least one part where the absorbance ratio Y (D1730/D1600) is 6 or more between a point that is 30% of the radius from the center and a point that is 90% of the radius from the center.

A part that exhibits an absorbance ratio Y of 6 or more preferably exists adjacent to a point that is 30% of the radius from the center. For example, the absorbance ratio can have a distribution curve in which it gradually decreases from a point that is 30% of the radius from the center at which it is 6 or more toward the surface area such that it becomes less than 3 at a point beyond 50%, 90%, or 98% from the center.

The polyacrylic acid ester-based resin microparticles have an average particle diameter in the range of from 30 to 1,000 nm, preferably in the range of from 120 to 700 nm, more preferably in the range of from 150 to 600 nm, and most preferably in the range of from 200 to 500 nm.

If the average particle diameter of the polyacrylic acid ester microparticles is less than 30 nm, the impact resistance of the obtained polystyrene-based resin expanded molded article may be insufficient. On the other hand, if the average particle diameter of the polyacrylic acid ester microparticles is more than 1,000 nm, the dissipation speed of the blowing agent may increase.

The modified polystyrene-based resin particles are preferably spherical, and the average particle diameter thereof is preferably from 0.3 to 2 mm and more preferably from 0.5 to 1.5 mm considering the fillability of the polystyrene-based resin pre-expanded particles into a mold.

(3) Polybutadiene-Terminated Acrylate

The modified polystyrene-based resin particles can comprise a component derived from polybutadiene-terminated acrylate.

As the polybutadiene-terminated acrylate, a monomer having a structure in which 1 or more (meth)acryloyl groups are bonded to a polybutadiene molecule comprising 80% or more of 1,2-bonds and 1,4-bonds can be used. Such a monomer preferably has a structure in which the (meth)acryloyl group is introduced to the end of the polybutadiene molecule. Specifically, the polybutadiene-terminated acrylate is a monomer having a polybutadiene molecule comprising the below-listed repeating unit (1) by 1,2-bonds, and the below-listed repeating unit (2) by 1,4-bonds, and a functional group ((meth)acryloyl group) represented by the formula (3) below on one or both ends of the polybutadiene molecule.

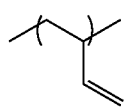

(1)

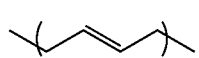

(2)

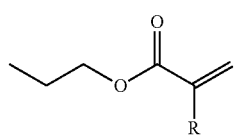

(3)

The molar ratio of the units (1) and (2) is preferably (1)/[(1)+(2)]≥0.8. The unit (2) can have trans configuration or cis configuration. The units (1) and (2) can exist in the monomer in various repeating patterns such as random, block, alternating, and the like.

In formula (3), R is preferably a hydrogen atom or a lower alkyl having 1 to 4 carbon atoms. The functional group of formula (3) is preferably positioned at both ends of the polybutadiene molecule.

As the polybutadiene-terminated acrylate, for example, BAC-45 and BAC-15 (product name) obtainable from Osaka Organic Chemical Industry Ltd. or the like can be used. A substance that is newly synthesized by the known method described below can also be used.

Specifically, examples include a (meth)acryl group is introduced into a polybutadiene structure by reacting a hydroxyl group-containing polybutadiene and a compound having a (meth)acryl group.

As the above-described method, for example, (i) a method in which the hydroxyl group of the hydroxyl group-containing polybutadiene and a carboxyl group of the compound having a (meth)acryl group are subjected to a dehydration reaction using a dehydration catalyst such as p-toluenesulfonic acid, and (ii) a method in which a (meth)acrylic acid ester and the hydroxyl group of the polybutadiene are subjected to transesterification using a transesterification catalyst such as a tin catalyst can be employed.

As the compound having a (meth)acryl group, examples include (meth)acrylic acid, methyl (meth)acrylate, ethyl (meth)acrylate, propyl (meth)acrylate, butyl (meth)acrylate, and the like (propyl and butyl comprise constitutional isomers).

The polybutadiene-terminated acrylate preferably has a number average molecular weight in the range of from 200 to 1,000,000. If the number average molecular weight is less than 200, the elasticity of the modified particles may decrease. If it is more than 1,000,000, there may be difficulties in introducing and dissolving the polybutadiene-terminated acrylate in the reaction system. The number average molecular weight is more preferably in the range of from 2,500 to 3,000. The number average molecular weight is a value obtained by measuring with gel permeation chromatography.

The polybutadiene-terminated acrylate preferably has a viscosity (25° C.) in the range of from 500 to 9,000 Pa·S. If the viscosity is less than 500 Pa·S, the elasticity of the modified particles may decrease. If it is more than 9,000 Pa·S, there may be difficulties in introducing and dissolving the polybutadiene-terminated acrylate in the reaction system. The viscosity is more preferably in the range of from 4,000 to 8,000 Pa·S. The viscosity is a value obtained by measuring with a rotational viscometer.

The component derived from the polybutadiene-terminated acrylate is preferably comprised in the modified particle in the range of from 0.1 to 3 parts by weight relative to a total of 100 parts by weight of the polystyrene-based resin and polyacrylic acid ester-based resin constituting the modified particle. If the content of this component is less than 0.1 parts by weight, the elasticity of the modified particles may decrease. If it is more than 3 parts by weight, the component may have trouble being absorbed into the modified particles. The content is more preferably from 0.5 to 1 parts by weight.

(Method of Manufacturing the Modified Polystyrene-Based Resin Particles)

The method of manufacturing the modified particles is characterized by comprising the following steps:

dispersing polyacrylic acid ester-based resin microparticles in seed particles consisting of polystyrene-based resin by causing the seed particles to absorb at least acrylic acid ester-based monomers in an aqueous medium and then polymerizing the acrylic acid ester-based monomers; and further growing polystyrene-based resin particles by causing the seed particles in which the polyacrylic acid ester-based resin microparticles are dispersed to absorb at least styrene-based monomers in the aqueous medium and then polymerizing the styrene-based monomers.

During absorption of the acrylic acid ester-based monomers into the seed particles, other monomers besides the acrylic acid ester-based monomers may be absorbed. A mixture of the acrylic acid ester-based monomers and the other monomers is referred to as a monomer mixture.

The method for manufacturing the modified particles comprises, for example:

a first polymerization step in which from 10 to 90 parts by weight of the acrylic acid ester-based monomers relative to 100 parts by weight of the seed particles consisting of polystyrene-based resin are supplied into a dispersion liquid manufactured by dispersing the seed particles consisting of polystyrene-based resin in water, and the acrylic acid ester-based monomers are absorbed into the seed particles and polymerized to grow polystyrene-based resin particles, and a second polymerization step in which styrene-based monomers are supplied into the dispersion liquid, absorbed into the seed particles, and polymerized to further grow the polystyrene-based resin particles.

After obtaining the modified particles upon completing the second polymerization step, or while growing the modified particles, a step for impregnating a blowing agent can be performed to obtain expandable particles as will be explained later.

As the acrylic acid ester-based monomers used in the first polymerization step, examples include those listed in the section above regarding the polyacrylic acid ester-based resin microparticles.

The amount to be used thereof is normally in the range of from 10 to 90 parts by weight relative to 100 parts by weight of the seed particles, and preferably in the range of from 20 to 80 parts by weight.

If the amount of the acrylic acid ester-based monomers is less than 10 parts by weight, the effect of improving the impact resistance of the obtained expanded molded article may not be sufficiently obtained. On the other hand, if it is more than 90 parts by weight, the acrylic acid ester-based monomers cannot be sufficiently absorbed into the seed particles and thus they may polymerize alone in the dispersion liquid, and as a result a large amount of polyacrylic acid ester-based resin microparticles that are not dispersed into the polystyrene-based resin particles may be generated.

If the modified particles comprise a component derived from polybutadiene-terminated acrylate, the polybutadiene-terminated acrylate can be absorbed and polymerized together with the acrylic acid ester-based monomers to incorporate it into the modified polystyrene-based resin particles.

As the styrene-based monomers used in the second polymerization step, mention may be made of the examples listed in the section above regarding the polystyrene-based resin particles.

(Seed Particles)

The seed particles consisting of polystyrene-based resin are not particularly limited, and can be manufactured by a known method. For example, mention may be made of a suspension polymerization method, or a method in which a raw material resin is melt kneaded in an extruder, extruded in a strand shape, and then cut into a desired particle diameter. Further, polystyrene-based resin recycled material can be used for part or all of the seed particles. The particles obtained from the suspension polymerization method or cutting method can be used as is, or styrene-based monomers can be impregnated and polymerized in the obtained particles in an aqueous medium.

The particle diameter of the seed particles can be appropriately adjusted depending on the average particle diameter of the modified particles or the like. For example, if modified particles having an average particle diameter of 1 mm are to be made, seed particles having an average particle diameter of approximately from 0.4 to 0.7 mm are preferably used.

The weight average molecular weight of the seed particles is not particularly limited, but is preferably from 150,000 to 700,000, and more preferably from 200,000 to 500,000.

Further, the above-described polybutadiene-terminated acrylate is preferably comprised in the seed particles.

(Polymerization Initiator)

The polymerization initiator may be used in the above-described manufacturing method and is not particularly limited as long as it is a polymerization initiator conventionally used in the polymerization of styrene-based monomers. For example, organic peroxides such as benzoyl peroxide, lauryl peroxide, t-butyl peroxybenzoate, t-butylperoxy-2-ethylhexanoate, t-butyl peroxide, t-butylperoxypivalate, t-butylperoxyisopropyl carbonate, t-butylperoxy acetate, 2,2-bis(t-butylperoxy)butane, t-butylperoxy-3,3,5-trimethylhexanoate, di-t-butylperoxy hexahydroterephthalate, 2,2-di-t-butylperoxybutane, di-t-hexylperoxide, dicumylperoxide, and the like; and azo compounds such as azobis isobutyronitrile, azobis dimethylvaleronitrile, and the like. These polymerization initiators can be used alone or in combination, but several types of polymerization initiators whose decomposition temperature for obtaining a half-life of 10 hours is from 60 to 130° C. are preferably used in combination.

(Suspension Stabilizer)

Further, in the above-described manufacturing method, a suspension stabilizer can be used to stabilize the dropping of the styrene-based monomers and the dispersibility of the seed particles. The suspension stabilizer is not particularly limited as long as it is a suspension stabilizer conventionally used in the polymerization of styrene-based monomers. For example, water-soluble polymers such as polyvinyl alcohol, methyl cellulose, polyacrylamide, polyvinyl pyrrolidone, and the like; and poorly soluble inorganic substances such as tricalcium phosphate, magnesium pyrrolinate, and the like may be used.

When a poorly soluble inorganic substance is used, it is normally used in combination with an anionic surfactant.

As the anionic surfactant, examples include, fatty acid soap; N-acylamino acid or a salt thereof; a carboxylate such as alkylether carboxylate and the like; a sulfonate such as alkylbenzene sulfonate, alkylnaphthalene sulfonate, dialkyl sulfosuccinate ester, alkyl sulfoacetate, α-olefin sulfonate, and the like; a sulfate ester such as higher alcohol sulfate ester, secondary higher alcohol sulfate ester, alkyl ether sulfate, polyoxyethylene alkylphenyl ether sulfate, and the like; and a phosphate ester such as alkyl ether phosphate ester, alkyl phosphate ester, and the like.

(Other Components)

To the modified particles, the following can be added within a range that does not compromise the properties: additives such as plasticizers, binding inhibitors, cell regulators, crosslinking agents, fillers, flame retardants, flame retardant promoters, lubricants, colorants, and the like.

Also, a powdered metallic soap such as zinc stearate can be applied to the surface of the expandable particles to be explained later. By applying such a powdered metallic soap, bonding of the pre-expanded particles to each other can be reduced in the pre-expanding step of the expandable particles.

In order to maintain good expanding and molding properties even if the pressure of the water vapor used during heat expansion is low, a plasticizer whose boiling point at 1 atm exceeds 200° C. can be incorporated into the modified particles.

As a plasticizer, mention may be made of, for example, a phthalate ester; a glycerin fatty acid ester such as glycerin diacetomonolaurate, glycerin tristearate, glycerin diacetomonostearate, and the like; an adipate ester such as diisobutyl adipate and the like; coconut oil, and the like.

The content of the plasticizer in the modified particles is less than 2% by weight.

(Expandable Particles)

The expandable particles comprise the modified particles and a volatile blowing agent, and can be manufactured by impregnating the volatile blowing agent into the modified particles using a known method.

If the temperature for impregnating the volatile blowing agent into the modified particles is low, the impregnation requires a long time and the manufacturing efficiency of the expandable particles decreases. On the other hand, if the temperature is high, a great deal of fusion of the expandable particles to each other may occur. Thus, the temperature is preferably from 70 to 130° C., and more preferably from 80 to 120° C.

(Blowing Agent)

The volatile blowing agent is not particularly limited as long as it is a blowing agent conventionally used in expanding polystyrene-based resin. For example, volatile blowing agents such as aliphatic hydrocarbons having 5 or less carbon atoms such as isobutane, n-butane, isopentane, neopentane, and the like may be used. In particular, a butane-based blowing agent and a pentane-based blowing agent are preferred, and a volatile blowing agent comprising pentane as a main component (for example, 50% by weight or more) is particularly preferred. Pentane can also be expected to act as a plasticizer.

The content of the volatile blowing agent in the expandable particles is normally in the range of from 2 to 10% by weight, preferably in the range of from 3 to 10% by weight, and particularly preferably in the range of from 3 to 8% by weight.

If the content of the volatile blowing agent is small, for example less than 2% by weight, a low density expanded molded article cannot be obtained from the expandable particles and an effect of increasing the secondary expanding force during expanding and molding in a mold cannot be obtained, and thus the outer appearance of the expanded molded article may worsen. On the other hand, if the content of the volatile blowing agent is large, for example exceeding 10% by weight, a long time is required for the cooling step in the process for manufacturing the expanded molded article using the expandable particles, and thus the productivity decreases.

(Auxiliary Blowing Agent)

An auxiliary blowing agent can be incorporated together with the blowing agent into the expandable particles.

The auxiliary blowing agent is not particularly limited as long as it is an auxiliary blowing agent conventionally used in expanding polystyrene-based resin. For example, an aromatic organic compound such as styrene, toluene, ethyl benzene, xylene, and the like; a cyclic aliphatic hydrocarbon such as cyclohexane, methyl cyclohexane, and the like; and a solvent whose boiling point at 1 atm is 200° C. or less such as ethyl acetate, butyl acetate, and the like may be used.

The content of the auxiliary blowing agent in the expandable particles is normally in the range of from 0.5 to 2.5% by weight, and preferably in the range of from 1 to 2% by weight.

If the content of the auxiliary blowing agent is small, for example less than 0.5% by weight, the plasticizing effect of the polystyrene-based resin may not be expressed. On the other hand, if the content of the auxiliary blowing agent is large, for example exceeding 2.5% by weight, the expanded molded article obtained by expanding the expandable particles may constrict or melt leading to a bad outer appearance, or a long time may be required for the cooling step in the process for manufacturing the expanded molded article using the expandable particles.

(Method for Manufacturing the Expandable Particles)

Given the above, the method for manufacturing the expandable particles is characterized by comprising the following steps:

dispersing polyacrylic acid ester-based resin microparticles in seed particles consisting of polystyrene-based resin by causing the seed particles to absorb at least acrylic acid ester-based monomers in an aqueous medium and then polymerizing the acrylic acid ester-based monomers;

further growing polystyrene-based resin particles by causing the seed particles in which the polyacrylic acid ester-based resin microparticles are dispersed to absorb at least styrene-based monomers in the aqueous medium and then polymerizing the styrene-based monomers; and impregnating a volatile blowing agent into the polystyrene-based resin particles either after or during the step for further growing the polystyrene-based resin particles.

Basically, the above method is characterized in that the volatile blowing agent is impregnated after performing the step for further growing the polystyrene-based resin particles to obtain the modified particles, or while growing the polystyrene-based resin particles. If the volatile blowing agent is to be impregnated after obtaining the modified particles, the modified particles can be removed from the aqueous medium used in the manufacture of the modified particles and then washed, dehydrated, and dried as necessary, and then the volatile blowing agent can be impregnated into the modified particles in a new aqueous medium. The volatile blowing agent can be also impregnated in the original aqueous medium used in the manufacture of the modified particles without removing the modified particles from the aqueous medium.

(Pre-Expanded Particles and Expanded Molded Article)

The pre-expanded particles are obtained using a known method by pre-expanding the expandable particles to a predetermined bulk density (for example, from 10 to 300 kg/m$^3$).

In the pre-expansion, air can be introduced simultaneously with steam when expanding as necessary.

The expanded molded article is obtained using a known method by, for example, filling the pre-expanded particles into a metal mold of a foam molding machine, and while re-heating and expanding the pre-expanded particles, the expanded particles are thermally fused to each other.

EXAMPLES

Below, concrete examples of the present invention are presented using examples. However, the following examples are merely examples of the present invention and the present invention is not limited to only the following examples Below, "parts" and "%" are on a by weight basis unless otherwise specified.

In the examples and comparative examples below, the average particle diameter of the expandable particles, the content of the blowing agent (comprised gas amount), the average particle diameter of the polyacrylic acid ester-based resin microparticles within the expandable particles, the absorbance ratio of the expandable particles, as well as the falling ball impact value, amount of displacement at point of rupture by bending, amount of cracking, and moldability of an expanded molded article having a bulk factor of 50 times were measured and evaluated by the following measurement methods and evaluation standards. The bulk density and the bulk factor of the expanded particles were also measured.

<Average Particle Diameter of Resin Particles>

The average particle diameter is a value expressed in D50.

In detail, a sample of approximately 50 g is classified for 10 minutes with a Ro-Tap sieve shaker (manufactured by Iida Seisakusho Co., Ltd.) using JIS standard sieves having sieve openings of 4.00 mm, 3.35 mm, 2.80 mm, 2.36 mm, 2.00 mm, 1.70 mm, 1.40 mm, 1.18 mm, 1.00 mm, 0.85 mm, 0.71 mm, 0.60 mm, 0.50 mm, 0.425 mm, 0.355 mm, 0.300 mm, 0.250 mm, 0.212 mm, and 0.180 mm, and then the weight of the sample is measured on the sieve screen. An accumulated weight distribution curve is created from the obtained results, and the particle diameter (median diameter) at which the accumulated weight is 50% is the average particle diameter.

<Content of Blowing Agent in Expandable Particles>

From 5 to 20 mg of the expandable particles are precisely weighed to create a measurement sample.

The measurement sample is set in a pyrolyzer (manufactured by Shimadzu Corp., PYR-1A) held at a temperature of from 180 to 200° C. and sealed, and then the measurement sample is heated over a period of 120 seconds to release the blowing agent component.

Next, a chart of the released blowing agent component is obtained using a gas chromatograph (manufactured by Shimadzu Corp., GC-14B, detector: FID). The content of the blowing agent (comprised gas content: % by weight) in the expandable particles is then calculated from the obtained chart based on a premeasured analytical curve of the blowing agent component.

<Average Particle Diameter of Polyacrylic Acid Ester-Based Resin Microparticles>

Particles are embedded in an epoxy resin, and the epoxy resin comprising the resin particles is processed using an ultramicrotome (manufactured by Leica Microsystems, LEICA ULTRACUT UCT) to yield an ultrathin section. A cross-section thereof is stained with ruthenium tetroxide.

Next, the stained section is made into an ultrathin section and photographed at 5,000 times magnification with a transmission electron microscope (manufactured by Hitachi High-Technologies, Inc., H-7600). The photograph is enlarged and printed so that one image covers an A4 sheet. The major axis and minor axis of 30 rubbers (polyacrylic acid ester-based resin microparticles) arbitrarily selected in a range of 150 mm×150 mm in the image are measured and averaged, and the result is the average particle diameter per one microparticle. The obtained overall average particle diameter is calculated, and the result is the average particle diameter of the polyacrylic acid ester-based resin microparticles.

<Absorbance Ratios of Surface Area and Inner Area>

(1) The absorbance ratio (D1730/D1600) of the surface area is measured with the following procedure.

The surface areas of ten (10) randomly selected particles are analyzed by an infrared spectroscopic analysis ATR measurement method to obtain infrared absorption spectrums. In this analysis, the infrared absorption spectrums are obtained for a range from the particle surface down to a depth of several micrometers (approximately 2 μm).

An individual absorbance ratio (D1730/D1600) is calculated from each infrared absorption spectrum, and the arithmetic mean of the individual absorbance ratios calculated for the surface area is the absorbance ratio.

The absorbance ratios D1730 and D1600 are measured under the following conditions using a measurement device sold as product name "Fourier Transform Infrared Spectrometer MAGNA 560" from Nicolet, Inc. and using "Thunderdome" manufactured by Spectra-Tech Co., Ltd. as an ATR accessory.

(Measurement Conditions)

High Refractive Index Crystal Type: Ge (germanium)
Incidence Angle: 45°±1°
Measurement Region: from 4000 cm$^{-1}$ to 675 cm$^{-1}$
Broken Number Dependence of Measurement Depth: uncorrected
Number of Reflections: 1 time
Detector: DTGS KBr
Resolution: 4 cm$^{-1}$
Number of Integrations: 32 times
Other: The infrared absorption spectrum is measured without contacting the sample under the above conditions. The measured spectrum is used as a background. During measurement of the sample, the measurement data is processed so that the background does not participate in the measurement spectrum. In the ATR method, the strength of the infrared absorption spectrum changes depending on the degree of adherence of the sample and the high refractive index crystal. Therefore, the measurement is carried out upon applying a maximum load that can be applied with the "Thunderdome" ATR accessory to make the degree of adherence nearly uniform.

The absorbance D1730 at 1730 cm$^{-1}$ obtained from the infrared absorption spectrum corresponds to an absorption spectrum derived from the stretching vibration between C=O of the ester group comprised in the above-described ester. In the measurement of this absorbance, peak separation is not carried out even if another absorption spectrum is overlapping at 1730 cm$^{-1}$. The absorbance D1730 indicates the maximum absorbance between 1680 cm$^{-1}$ and 1785 cm$^{-1}$ with the straight line connecting 1680 cm$^{-1}$ and 1785 cm$^{-1}$ as a baseline.

The absorbance D1600 at 1600 cm$^{-1}$ obtained from the infrared absorption spectrum corresponds to an absorption spectrum derived from the in-plane vibration of a benzene ring comprised in the polystyrene-based resin. In the measurement of this absorbance, peak separation is not carried out even if another absorption spectrum is overlapping at 1600 cm$^{-1}$. The absorbance D1600 indicates the maximum absorbance between 1565 cm$^{-1}$ and 1640 cm$^{-1}$ with the straight line connecting 1565 cm$^{-1}$ and 1640 cm$^{-1}$ as a baseline.

(2) The absorbance ratio (D1730/D1600) of the inner area is measured with the following procedure.

(a) Preparation of Measurement Sample

Ten (10) randomly selected particles are fixed to an epoxy resin pedestal. Next, the particles are sliced through approximately the center to a thickness of approximately 10 μm by a diamond knife using an ultramicrotome (manufactured by Leica Microsystems, LEICA ULTRACUT UCT) to obtain a sliced sample. The obtained sliced sample is sandwiched between two barium fluoride crystals (manufactured by Pier Optics Ltd.), and this is used as the measurement sample.

(b) Setting the X and Y Coordinates of Center Point

An image of the sliced sample is captured with a CCD attached to the measurement device described below. In the image capture, the progression direction of the knife of the ultramicrotome is the Y axis and the perpendicular direction relative to the progression direction is the X axis. In the particles in the sliced sample, very slight collapse occurs in the progression direction of the knife. By setting the Y axis of the captured image to match the progression direction of the knife, irregularities in the measured absorbance ratio are suppressed.

For the absorbances D1730 and D1600, a device sold under the product name "FT-IR Imaging System Spectrum Spotlight 300" from Perkin Elmer, Inc. is used. Using this device, an image of the sliced sample is obtained under the following conditions. From the obtained image, an infrared absorption spectrum at each part is obtained under the following conditions.

Measurement Conditions
Mode: transmission
Pixel Size: 6.25 μm
Measurement Region: from 4000 cm$^{-1}$ to 650 cm$^{-1}$
Detector: MCT
Resolution: 8 cm$^{-1}$
Scans/Pixel: 2 times From the captured image, as shown in FIG. 1, the minimum and maximum X coordinate values and the minimum and maximum Y coordinate values on the Y axis are connected with lines, and the intersection of these lines is set as a center point A. The X and Y coordinate values of the center point in the image processing are set so that they fall within a range of center point A ±20 μm.

Next, a straight line is drawn parallel to the X axis through the center point A in the image. A point at which the straight line intersects an end part at which a particle (resin) exists (maximum value on X axis) is called a point D. An infrared absorption spectrum on a line connecting point A and point D is extracted at each 12±2 μm of X coordinate value.

The absorbances D1730 and D1600 are each read from the extracted infrared absorption spectrums, and an individual absorbance ratio (D1730/D1600) in each infrared absorption spectrum is calculated. The arithmetic mean of the individual absorbance ratios calculated for the 10 particles is the absorbance ratio.

An absorbance ratio graph for the particle cross-section is prepared, in which a part from the center part of the extracted infrared absorption spectrum is the X axis and the absorbance ratio corresponding to the X axis is the Y axis. The absorbance ratio Y of the center part is read from this graph.

(Background Measurement Conditions)
Mode: transmission
Pixel Size: 6.25 μm
Measurement Region: from 4000 cm$^{-1}$ to 650 cm$^{-1}$
Detector: MCT
Resolution: 8 cm$^{-1}$
Scans/Pixel: 60 times Other: An infrared absorption spectrum measuring a barium fluoride crystal of a portion near the sample where no sample exists is used as a background and processing to prevent it from participating in the measurement spectrum is carried out.

<Falling Ball Impact Value of Expanded Molded Article>

A falling ball impact strength is measured based on the method described in JIS K7211:1976 "General Rules for Testing Impact Strength of Rigid Plastics by the Falling Weight Method".

An obtained expanded molded article having a bulk factor of 50 times is dried for one day at a temperature of 50° C., and then a test piece (no skin on all 6 surfaces) of 40 mm×215 mm×20 mm (thickness) is cut out from the expanded molded article.

Next, both ends of the test piece are fixed by clamps so that the interval between the support points is 150 mm, and a hard ball weighing 321 g is dropped from a predetermined height onto the center of the test piece. The presence of breakage in the test piece is observed.

The test is repeated changing the dropping height (test height) of the hard ball by 5 cm intervals from a minimum height at which every sample among 5 test pieces breaks to a maximum height at which no sample among 5 test pieces breaks. The falling ball impact value (cm), or in other words the 50% break height, is calculated by the following formula.

$$H50 = Hi + d[\Sigma(i \cdot ni)/N \pm 0.5]$$

The symbols within the formula indicate the following.
H50: 50% break height (cm)
Hi: test height (cm) when the height level (i) is 0, and the height at which the test piece is expected to break
d: height interval (cm) when sample height is raised/lowered
i: height level increased/decreased by 1 at a time with Hi as 0 (i= . . . −3, −2, −1, 0, 1, 2, 3 . . . )
ni: number of test pieces that broke (or did not break) at each level, and whichever provided more data is used (if the numbers are the same, either can be used)

N: total number (N=Σni) of test pieces that broke (or did not break), and whichever provided more data is used (if the numbers are the same, either can be used)

±0.5: negative number is used when using data for pieces that broke, and positive number is used when using data for pieces that didn't break The obtained falling ball impact value is evaluated using the following standards. A larger falling ball impact value indicates a higher impact resistance of the expanded molded article.

Θ (best): falling ball impact value of 13 cm or more

○ (good): falling ball impact value of 11 cm or more and less than 13 cm

Δ (acceptable): falling ball impact value of 9 cm or more and less than 11 cm

X (unacceptable): falling ball impact value of less than 9 cm

<Amount of Displacement at Point of Rupture by Bending of Expanded Molded Article>

The bending strength is measured based on the method described in JIS K7221-1:2006 "Rigid Cellular Plastics—Bending Test—Part 1: Bending Test".

An obtained expanded molded article having a bulk factor of 50 times is dried for one day at a temperature of 50° C., and then a test piece of 25 mm×130 mm×20 mm (thickness) is cut out from the expanded molded article.

Next, a pressurized wedge 5R and a support 5R are mounted as distal end jigs on a universal tester (manufactured by Orientec Co., Ltd., Tensilon® UCT-10T), the test piece is set with a distance of 100 mm between the support points, and a bending test is carried out under conditions of a compression rate of 10 mm/min. In this test, the rupture detection sensitivity is set to 0.5%. When the increase/decrease exceeds the setting value of 0.5% compared to a previous load sampling point, the previous sampling point is measured as the amount of displacement at point of rupture by bending (mm).

The obtained amount of displacement at point of rupture by bending is evaluated using the following standards. A larger amount of displacement at point of rupture by bending indicates a higher flexibility of the expanded molded article.

Θ (best): amount of displacement at point of rupture by bending of 14 mm or more ○ (good): amount of displacement at point of rupture by bending of 12 mm or more and less than 14 mm Δ (acceptable): amount of displacement at point of rupture by bending of 10 mm or more and less than 12 mm X (unacceptable): amount of displacement at point of rupture by bending of less than 10 mm <Amount of Cracking of Expanded Molded Article>

The amount of cracking is measured based on the method described in JIS Z0235:1976 "Cushioning Materials for Packaging—Evaluation Test Method".

An obtained expanded molded article having a bulk factor of 50 times is dried for one day at a temperature of 50° C., and then a test piece of 75 mm×300 mm×50 mm (thickness) is cut out from the expanded molded article.

Figure 2:
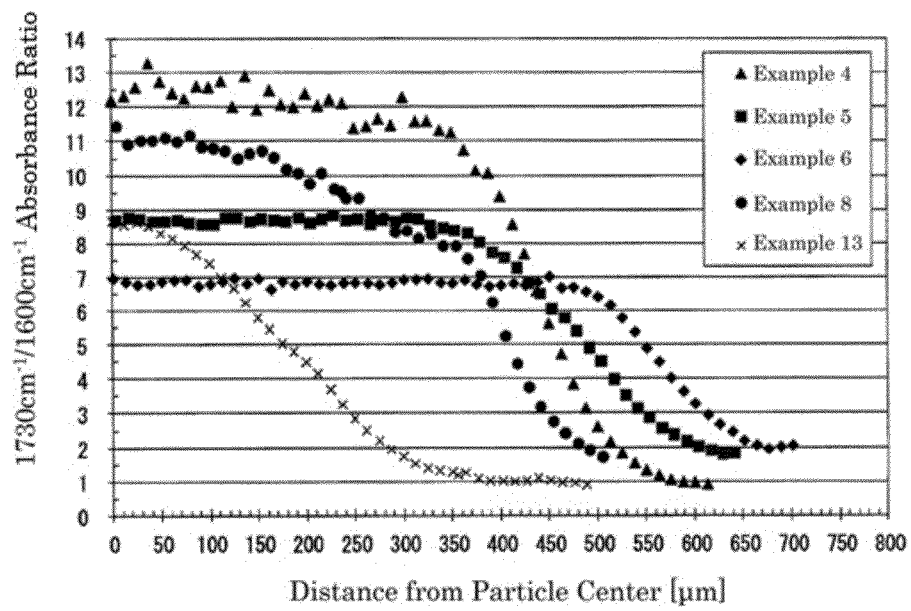
FIG. 2 is a graph showing the relationship between the distance from the center and the absorbance ratio in the modified particles of Examples 4 to 6, 8, and 13.
Figure 3:
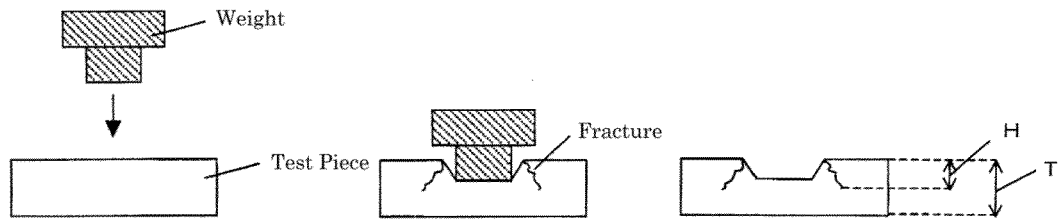
FIG. 3 is a schematic view for explaining the method for measuring the cracking (fracture) amount of an expanded molded article.

Next, the test piece is lightly fixed in the center of the base of a falling impact tester for cushioning materials (manufactured by Yoshida Seiki, CST-320S) so that the test piece does not move when impacted. As shown in FIG. 2, a weight weighing 13.5 kg is dropped from a height of 60 cm so that it falls in approximately the center in the length direction of the test piece and across the entire surface of the test piece in the width direction. Fractures in the test piece that occur at this time are observed, and the cracking amount (%) is calculated by the following formula.

$$S = H/T \times 100$$

The symbols within the formula indicate the following.

S: cracking amount (%)
H: fracture dimension (mm)
T: thickness of test piece (mm)

The obtained cracking amount is evaluated using the following standards. A smaller cracking amount indicates a higher impact resistance of the expanded molded article.

Θ (best): cracking amount of 45% or less

○ (good): cracking amount of 45% or more and less than 50%

Δ (acceptable): cracking amount of 50% or more and less than 55%

X (unacceptable): cracking amount of 55% or more

<Moldability of Expanded Molded Article>

The outer appearance of the expanded molded article is observed visually, and the moldability of the expanded molded article is evaluated using the following standards.

Θ (best): no melting on the surface of the molded article or no constriction of the molded article ○ (good): very slight melting on the surface of the molded article or very slight constriction of the molded article Δ (acceptable): melting on the surface of the molded article or constriction of the molded article, and a deteriorated outer appearance of the molded article (no effect on the impact resistance)

<Bulk Density and Bulk Factor of the Pre-Expanded Particles>

The bulk density and bulk factor of the pre-expanded particles are measured as follows.

A weight (a) of approximately 5 g of pre-expanded particles is precisely weighed to two decimal places, and the weighed pre-expanded particles are inserted into a 500 cm³ graduated cylinder with a minimum scale unit of 5 cm³. Next, a pressing tool, consisting of a circular resin board that is slightly smaller than the opening of the graduated cylinder to which a rod-shaped resin board having a width of approximately 1.5 cm and a length of approximately 30 cm is fixed upright at the center, is pressed to the opening of the graduated cylinder, and the volume (b) of the pre-expanded particles is read.

From the obtained weight (a) of the pre-expanded particles and the volume (b) of the pre-expanded particles, the bulk density and the bulk factor of the pre-expanded particles are calculated using the following formulas:

$$\text{Bulk Density (g/cm}^3\text{)} = (a)/(b)$$

$$\text{Bulk Factor} = \text{Inverse of Bulk Density} = (b)/(a).$$

Example 1

Manufacture of Seed (Core PS) Particles

Into a polymerization vessel with stirrer having an internal volume of 100 liters, 40,000 g of water, 100 g of tricalcium phosphate as a suspension stabilizer, and 2 g of sodium dodecylbenzene sulfonate as an anionic surfactant were supplied, and then 40,000 g of styrene monomers, 96 g of benzoyl peroxide, and 28 g of t-butyl peroxybenzoate as polymerization initiators were added while stirring. The temperature was then raised to 90° C. to polymerize. This temperature was held for 6 hours, and then the temperature was raised to 125° C. for 2 hours and then cooled to obtain polystyrene-based resin particles (A).

The polystyrene-based resin particles (A) were sifted, and polystyrene-based resin particles (B-1) having a particle diameter of from 0.5 to 0.71 mm (average particle diameter D50=0.66 mm) and polystyrene-based resin particles (B-2) having a particle diameter of from 0.71 mm to 1.18 mm (average particle diameter D50=0.99 mm) were obtained as seed particles.

(Manufacture of Modified Particles)

Next, into a polymerization vessel with stirrer having an internal volume of 5 liters, 2,000 g of water, 500 g of the polystyrene-based resin particles (B-1) as seed particles, 8 g of magnesium pyrrolinate as a suspension stabilizer, and 0.4 g of sodium dodecylbenzene sulfonate as an anionic surfactant were supplied, and the temperature was raised to 75° C. while stirring.

Next, 200 g of butyl acrylate into which 6 g of benzoyl peroxide and 0.75 g of t-butyl peroxybenzoate were dissolved as polymerization initiators was supplied into the 5-liter polymerization vessel, and then the butyl acrylate was absorbed into the seed particles. This was held at 75° C. for 120 minutes to polymerize, and thereby a reaction liquid was obtained.

Next, while raising the temperature of the reaction liquid to 120° C. for 225 minutes, 1,300 g of styrene monomers were supplied into the polymerization vessel by a certain amount at a time for 200 minutes. Next, after raising the temperature to 120° C., the temperature was raised to 130° C. and then cooled after 2 hours had passed to obtain modified particles.

The average particle diameter of the obtained modified particles, the average particle diameter of the polyacrylic acid ester-based resin microparticles therein, and the absorbance ratios of the surface area and center part were measured. The results are shown in Tables 1 and 2.

(Manufacture of Expandable Particles)

Next, into another polymerization vessel with stirrer having an internal volume of 5 liters, 2,200 g of water, 1,800 g of the modified particles, 7.2 g of magnesium pyrrolinate as a suspension stabilizer, and 0.36 g of sodium dodecylbenzene sulfonate were supplied, and the temperature was raised to 100° C. while stirring. Next, 180 g of pentane (gas type a: manufactured by Cosmo Oil Co., Ltd., product name Pentane) in which n-pentane/iso-pentane=75/25 to 85/15 was injected as a blowing agent into the 5-liter polymerization vessel and held for 3 hours to obtain expandable particles. After holding, the expandable particles were cooled to 30° C. or less, and then removed from the polymerization vessel, dried, and left to stand for five days in a 13° C. isothermal room.

(Pre-Expansion of Expandable Particles)

Next, the surface of the expandable particles was coated with a surface treatment agent consisting of zinc stearate and hydroxystearic acid triglyceride. After this treatment, the expandable particles were introduced into a normal pressure pre-exapander that was pre-heated by steam. Steam was introduced therein at a setting of approximately 0.02 MPa while stirring to pre-expand the expandable particles to a bulk factor of 50 times in approximately 2 to 3 minutes.

(Manufacture of Expanded Molded Article)

The pre-expanded particles were matured for 24 hours at room temperature after pre-expanding and then filled into the cavity of a foamed bead automatic molding machine (manufactured by Sekisui Machinery Co., Ltd., ACE-3SP) comprising a metal mold having a cuboid cavity with internal dimensions of 300 mm×400 mm×50 mm (thickness). After filling, the pre-expanded particles were steam heated and cooled under the following conditions, and then an expanded molded article was removed from the metal mold to obtain the expanded molded article.

(Molding Conditions)

Metal Mold Heating: 5 seconds
One Side Heating: 10 seconds
Opposite Side Heating: 5 seconds
Both Surface Heating: 20 seconds
Water Cooling: 10 seconds
Setting Steam Pressure: 0.07 MPa For the obtained expanded molded article, the falling ball impact value, amount of displacement at point of rupture by bending, amount of cracking, and moldability were measured and evaluated. The results thereof are shown in Tables 1 and 2.

Example 2

Polystyrene-based resin particles, expandable particles, pre-expanded particles, and an expanded molded article were obtained, measured, and evaluated in the same way as in Example 1 except that in the manufacture of the modified particles, 2-ethylhexyl acrylate was used instead of butyl acrylate. The results thereof are shown in Tables 1 and 2.

Example 3

Polystyrene-based resin particles, expandable particles, pre-expanded particles, and an expanded molded article were obtained, measured, and evaluated in the same way as in Example 1 except that in the manufacture of the modified particles, ethyl acrylate was used instead of butyl acrylate. The results thereof are shown in Tables 1 and 2.

Example 4

Manufacture of Modified Particles

Into a polymerization vessel with stirrer having an internal volume of 5 liters, 2,000 g of water, 1,000 g of the polystyrene-based resin particles (B-2) obtained in Example 1 as seed particles, 8 g of magnesium pyrrolinate as a suspension stabilizer, and 0.4 g of sodium dodecylbenzene sulfonate as an anionic surfactant were supplied, and the temperature was raised to 75° C. while stirring.

Next, 400 g of butyl acrylate into which 4 g of benzoyl peroxide and 0.5 g of t-butyl peroxybenzoate were dissolved as polymerization initiators was supplied into the 5-liter polymerization vessel, and then the butyl acrylate was absorbed into the seed particles. This was held at 75° C. for 120 minutes to polymerize, and thereby a reaction liquid was obtained.

Next, while raising the temperature of the reaction liquid to 115° C. for 160 minutes, 600 g of styrene monomers were supplied into the polymerization vessel by a certain amount at a time for 120 minutes. Next, after raising the temperature to 115° C., the temperature was raised to 130° C. and then cooled after 2 hours had passed to obtain modified particles.

The average particle diameter of the obtained modified particles, the average particle diameter of the polyacrylic acid ester-based resin microparticles therein, and the absorbance ratios of the surface area and center part were measured. The results are shown in Tables 1 and 2.

(Manufacture of Expandable Particles)

Next, into another polymerization vessel with stirrer having an internal volume of 5 liters, 2,200 g of water, 1,800 g of the modified particles, 7.2 g of magnesium pyrrolinate as a suspension stabilizer, and 0.36 g of sodium dodecylbenzene sulfonate were supplied, and the temperature was raised to 100° C. while stirring. Next, 126 g of pentane (gas type a: manufactured by Cosmo Oil Co., Ltd., product name Pentane) in which n-pentaneiso-pentane=75/25 to 85/15 was injected as a blowing agent into the 5-liter polymerization vessel and held for 3 hours to obtain expandable particles. After holding, the expandable particles were cooled to 30° C. or less, and then removed from the polymerization vessel, dried, and left to stand for five days in a 13° C. isothermal room.

(Pre-Expansion of Expandable Particles and Manufacture of Expanded Molded Article)

Pre-expanded particles and an expanded molded article were obtained from the obtained expandable particles and measured and evaluated in the same way as in Example 1. The results thereof are shown in Tables 1 and 2. The relationship (the distribution state in a polybutyl acrylate cross-section) between the distance from the center of the polystyrene-based resin particles and the absorbance ratio is shown in FIG. 2.

Example 5

Manufacture of Modified Particles

Into a polymerization vessel with stirrer having an internal volume of 5 liters, 2,000 g of water, 1,000 g of the polystyrene-based resin particles (B-2) obtained in Example 1 as seed particles, 8 g of magnesium pyrrolinate as a suspension stabilizer, and 0.4 g of sodium dodecylbenzene sulfonate as an anionic surfactant were supplied, and the temperature was raised to 75° C. while stirring.

Next, 400 g of butyl acrylate into which 0.8 g of dicumylperoxide was dissolved as a polymerization initiator was supplied into the 5-liter polymerization vessel, and then the butyl acrylate was absorbed into the seed particles. This was held at 75° C. for 60 minutes, and subsequently, the temperature was raised to 130° C. and held for 2 hours.

Afterwards, the temperature was lowered to 75° C., and 100 g of styrene monomers in which 2.4 g of benzoyl peroxide and 0.5 g of t-butyl peroxybenzoate were dissolved as polymerization initiators was supplied into the 5-liter polymerization vessel, and then the styrene monomers were absorbed into the seed particles. This was held at 75° C. for 60 minutes to polymerize, and thereby a reaction liquid was obtained.

Next, while raising the temperature of the reaction liquid to 110° C. for 140 minutes, 500 g of styrene monomers were supplied into the polymerization vessel by a certain amount at a time for 100 minutes. Next, after raising the temperature to 110° C., the temperature was raised to 140° C. and then cooled after 2 hours had passed to obtain modified particles.

The average particle diameter of the obtained modified particles, the average particle diameter of the polyacrylic acid ester-based resin microparticles therein, and the absorbance ratios of the surface area and center part were measured. The results are shown in Table 1.

(Manufacture of Expandable Particles, Pre-Expansion of Expandable Particles, and Manufacture of Expanded Molded Article)

Next, expandable particles were manufactured from the obtained modified particles in the same way as in Example 4, and pre-expanded particles and an expanded molded article were obtained from the obtained expandable particles and measured and evaluated in the same way as in Example 1. The results thereof are shown in Tables 1 and 2. The relationship between the distance from the center of the modified particles and the absorbance ratio is shown in FIG. 2.

Example 6

Manufacture of Modified Particles

Into a polymerization vessel with stirrer having an internal volume of 5 liters, 2,000 g of water, 600 g of the polystyrene-based resin particles (B-2) obtained in Example 1 as seed particles, 8 g of magnesium pyrrolinate as a suspension stabilizer, and 0.4 g of sodium dodecylbenzene sulfonate as an anionic surfactant were supplied, and the temperature was raised to 75° C. while stirring.

Next, 400 g of butyl acrylate into which 0.8 g of dicumylperoxide was dissolved as a polymerization initiator was supplied into the 5-liter polymerization vessel, and then the butyl acrylate was absorbed into the seed particles. This was held at 75° C. for 120 minutes. Subsequently, the temperature was raised to 130° C. and held for 2 hours.

Afterwards, the temperature was lowered to 75° C., and 200 g of styrene monomers in which 4 g of benzoyl peroxide and 0.7 g of t-butyl peroxybenzoate were dissolved as polymerization initiators was supplied into the 5-liter polymerization vessel, and then the styrene monomers were absorbed into the seed particles. This was held at 75° C. for 60 minutes to polymerize, and thereby a reaction liquid was obtained.

Next, while raising the temperature of the reaction liquid to 115° C. for 160 minutes, 800 g of styrene monomers were supplied into the polymerization vessel by a certain amount at a time for 140 minutes. Next, after raising the temperature to 115° C., the temperature was raised to 140° C. and then cooled after 2 hours had passed to obtain modified particles.

For the obtained modified particles, the average particle diameter of the resin particles, the average particle diameter of the polyacrylic acid ester-based resin microparticles therein, and the absorbance ratios of the surface area and center part of the resin particles were measured. The results are shown in Tables 1 and 2. A mapping image of the modified particles is shown in FIG. 1 and the relationship between the distance from the center of the polystyrene-based resin particles and the absorbance ratio is shown in FIG. 2. In FIG. 1, a decrease in the absorbance ratio from the surface area toward the center part is illustrated with color coding.

(Manufacture of Expandable Particles, Pre-Expansion of Expandable Particles, and Manufacture of Expanded Molded Article)

Next, expandable particles were manufactured from the obtained modified particles in the same way as in Example 4, and pre-expanded particles and an expanded molded article were obtained from the obtained expandable particles and measured and evaluated in the same way as in Example 1. The results thereof are shown in Tables 1 and 2.

Example 7

Manufacture of Modified Particles

Into a polymerization vessel with stirrer having an internal volume of 5 liters, 2,000 g of water, 500 g of the polystyrene-based resin particles (B-1) obtained in Example 1 as seed particles, 8 g of magnesium pyrrolinate as a suspension stabilizer, and 0.4 g of sodium dodecylbenzene sulfonate as an anionic surfactant were supplied, and the temperature was raised to 75° C. while stirring.

Next, 200 g of butyl acrylate into which 0.4 g of dicumylperoxide was dissolved as a polymerization initiator was supplied into the 5-liter polymerization vessel, and then the butyl acrylate was absorbed into the seed particles. This was held at 75° C. for 60 minutes. Subsequently, the temperature was raised to 130° C. and held for 2 hours.

Afterwards, the temperature was lowered to 75° C., and 200 g of styrene monomers in which 5.2 g of benzoyl peroxide and 0.75 g of t-butyl peroxybenzoate were dissolved as polymerization initiators was supplied into the 5-liter polymerization vessel, and then the styrene monomers were absorbed into the seed particles. This was held at 75° C. for 60 minutes to polymerize, and thereby a reaction liquid was obtained.

Next, while raising the temperature of the reaction liquid to 120° C. for 180 minutes, 1,100 g of styrene monomers were supplied into the polymerization vessel by a certain amount at a time for 160 minutes. Next, after raising the temperature to 120° C., the temperature was raised to 140° C. and then cooled after 2 hours had passed to obtain modified particles.

The average particle diameter of the obtained modified particles, the average particle diameter of the polyacrylic acid ester-based resin microparticles therein, and the absorbance ratios of the surface area and center part were measured. The results are shown in Tables 1 and 2.

(Manufacture of Expandable Particles, Pre-Expansion of Expandable Particles, and Manufacture of Expanded Molded Article)

Expandable particles were manufactured in the same way as in Example 4 except that in the manufacture of the expandable particles, the amount of pentane (gas type a: manufactured by Cosmo Oil Co., Ltd., product name Pentane) in which n-pentane/iso-pentane=75/25 to 85/15 as the blowing agent was changed from 126 g to 162 g. Then, pre-expanded particles and an expanded molded article were obtained, measured, and evaluated. The results thereof are shown in Tables 1 and 2.

Example 8

Manufacture of Modified Particles

Into a polymerization vessel with stirrer having an internal volume of 5 liters, 2,000 g of water, 600 g of the polystyrene-based resin particles (B-1) obtained in Example 1 as seed particles, 8 g of magnesium pyrrolinate as a suspension stabilizer, and 0.4 g of sodium dodecylbenzene sulfonate as an anionic surfactant were supplied, and the temperature was raised to 75° C. while stirring.

Next, 400 g of butyl acrylate into which 0.8 g of dicumylperoxide was dissolved as a polymerization initiator was supplied into the 5-liter polymerization vessel, and then the butyl acrylate was absorbed into the seed particles. This was held at 75° C. for 120 minutes. Subsequently, the temperature was raised to 130° C. and held for 2 hours.

Afterwards, the temperature was lowered to 75° C., and 200 g of styrene monomers in which 4 g of benzoyl peroxide and 0.7 g of t-butyl peroxybenzoate were dissolved as polymerization initiators was supplied into the 5-liter polymerization vessel, and then the styrene monomers were absorbed into the seed particles. This was held 75° C. for 60 minutes to polymerize, and thereby a reaction liquid was obtained.

Next, while raising the temperature of the reaction liquid to 115° C. for 160 minutes, 800 g of styrene monomers were supplied into the polymerization vessel by a certain amount at a time for 120 minutes. Next, after raising the temperature to 115° C., the temperature was raised to 140° C. and then cooled after 2 hours had passed to obtain modified particles.

The average particle diameter of the obtained modified particles, the average particle diameter of the polyacrylic acid ester-based resin microparticles therein, and the absorbance ratios of the surface area and center part were measured. The results are shown in Tables 1 and 2.

(Manufacture of Expandable Particles, Pre-Expansion of Expandable Particles, and Manufacture of Expanded Molded Article)

Expandable particles were manufactured in the same way as in Example 4 except that in the manufacture of the expandable particles, the amount of pentane (gas type a: manufactured by Cosmo Oil Co., Ltd., product name Pentane) in which n-pentane/iso-pentane=75/25 to 85/15 as the blowing agent was changed from 126 g to 144 g. Then, pre-expanded particles and an expanded molded article were obtained, measured, and evaluated. The results thereof are shown in Tables 1 and 2. The relationship between the distance from the center of the modified particles and the absorbance ratio is shown in FIG. 2.

Example 9

Manufacture of Polystyrene-Based Resin Particles, Manufacture of Expandable Particles, Pre-Expansion of Expandable Particles, and Manufacture of Expanded Molded Article Expandable particles were manufactured in the same way as in Example 8 except that in the manufacture of the expandable particles, 126 g of butane (gas type b: manufactured by Cosmo Oil Co., Ltd., product name Cosmo Butane Silver) in which n-butane/iso-butane=60/40 to 70/30 is used as the blowing agent instead of 144 g of pentane (gas type a: manufactured by Cosmo Oil Co., Ltd., product name Pentane) in which n-pentane/iso-pentane=75/25 to 85/15. Then pre-expanded particles and an expanded molded article were obtained, measured, and evaluated. The results thereof are shown in Tables 1 and 2.

Example 10

Manufacture of Modified Particles

Into a polymerization vessel with stirrer having an internal volume of 5 liters, 2,000 g of water, 1,500 g of the polystyrene-based resin particles (B-2) obtained in Example 1 as seed particles, 8 g of magnesium pyrrolinate as a suspension stabilizer, and 0.4 g of sodium dodecylbenzene sulfonate as an anionic surfactant were supplied, and the temperature was raised to 75° C. while stirring.

Next, 200 g of butyl acrylate into which 2 g of benzoyl peroxide and 0.25 g of t-butyl peroxybenzoate were dissolved as polymerization initiators was supplied into the 5-liter polymerization vessel, and then the butyl acrylate was absorbed into the seed particles. This was held at 75° C. for 60 minutes to polymerize, and thereby a reaction liquid was obtained.

Next, the temperature of the reaction liquid was raised to 90° C., and 300 g of styrene monomers were supplied into the 5-liter polymerization vessel, and this was held at 90° C. for 180 minutes. Next, the temperature was raised to 130° C. and then cooled after 2 hours had passed to obtain modified particles.

The average particle diameter of the obtained modified particles, the average particle diameter of the polyacrylic acid ester-based resin microparticles therein, and the absorbance ratios of the surface area and center part were measured. The results are shown in Tables 1 and 2.

(Manufacture of Expandable Particles, Pre-Expansion of Expandable Particles, and Manufacture of Expanded Molded Article)

Expandable particles, pre-expanded particles, and an expanded molded article were obtained from the obtained modified particles and then measured and evaluated in the same way as in Example 1. The results thereof are shown in Tables 1 and 2.

Example 11

Manufacture of Modified Particles

Into a polymerization vessel with stirrer having an internal volume of 5 liters, 2,000 g of water, 1,500 g of the polystyrene-based resin particles (B-2) obtained in Example 1 as seed particles, 8 g of magnesium pyrrolinate as a suspension stabilizer, and 0.4 g of sodium dodecylbenzene sulfonate as an anionic surfactant were supplied, and the temperature was raised to 75° C. while stirring.

Next, 400 g of butyl acrylate into which 2 g of benzoyl peroxide and 0.25 g of t-butyl peroxybenzoate were dissolved as polymerization initiators was supplied into the 5-liter polymerization vessel, and then the butyl acrylate was absorbed into the seed particles. This was held at 75° C. for 120 minutes to polymerize, and thereby a reaction liquid was obtained.

Next, the temperature of the reaction liquid was raised to 90° C., and 100 g of styrene monomers were supplied into the polymerization vessel, and this was held at 90° C. for 120 minutes. Next, the temperature was raised to 130° C. and then cooled after 2 hours had passed to obtain modified particles.

The average particle diameter of the obtained modified particles, the average particle diameter of the polyacrylic acid ester-based resin microparticles therein, and the absorbance ratios of the surface area and center part were measured. The results are shown in Tables 1 and 2.

(Manufacture of Expandable Particles, Pre-Expansion of Expandable Particles, and Manufacture of Expanded Molded Article)

Expandable particles, pre-expanded particles, and an expanded molded article were obtained from the obtained modified particles and then measured and evaluated in the same way as in Example 1. The results thereof are shown in Tables 1 and 2.

Example 12

Modified particles, expandable particles, pre-expanded particles, and an expanded molded article were obtained, measured, and evaluated in the same way as in Example 4 except that in the manufacture of the modified particles, instead of supplying 600 g of styrene monomers into the polymerization vessel by a certain amount at a time for 120 minutes, 600 g of styrene monomers were supplied into the polymerization vessel by a certain amount at a time for 60 minutes. The results thereof are shown in Tables 1 and 2.

Example 13

Manufacture of Modified Particles

Into a polymerization vessel with stirrer having an internal volume of 5 liters, 2,000 g of water, 300 g of the polystyrene-based resin particles (B-1) obtained in Example 1 as seed particles, 8 g of magnesium pyrrolinate as a suspension stabilizer, and 0.4 g of sodium dodecylbenzene sulfonate as an anionic surfactant were supplied, and the temperature was raised to 75° C. while stirring.

Next, 200 g of butyl acrylate into which 6.8 g of benzoyl peroxide and 0.85 g of t-butyl peroxybenzoate were dissolved as polymerization initiators was supplied into the 5-liter polymerization vessel, and then the butyl acrylate was absorbed into the seed particles. This was held at 75° C. for 120 minutes to polymerize, and thereby a reaction liquid was obtained.

Next, while raising the temperature of the reaction liquid to 120° C. for 225 minutes, 1,500 g of styrene monomers were supplied into the polymerization vessel by a certain amount at a time for 200 minutes. Next, after raising the temperature to 120° C., the temperature was raised to 130° C. and then cooled after 2 hours had passed to obtain modified particles.

The average particle diameter of the obtained modified particles, the average particle diameter of the polyacrylic acid ester-based resin microparticles therein, and the absorbance ratios of the surface area and center part were measured. The results are shown in Tables 1 and 2.

(Manufacture of Expandable Particles, Pre-Expansion of Expandable Particles, and Manufacture of Expanded Molded Article)

Expandable particles, pre-expanded particles, and an expanded molded article were obtained from the obtained modified particles, measured, and evaluated in the same way as in Example 8. The results thereof are shown in Tables 1 and 2. The relationship between the distance from the center of the modified particles and the absorbance ratio is shown in FIG. 2.

Comparative Example 1

Manufacture of Polystyrene-Based Resin Particles

Into a polymerization vessel with stirrer having an internal volume of 5 liters, 2,000 g of water, 500 g of the polystyrene-based resin particles (B-1) obtained in Example 1 as seed particles, 8 g of magnesium pyrrolinate as a suspension stabilizer, and 0.4 g of sodium dodecylbenzene sulfonate as an anionic surfactant were supplied, and the temperature was raised to 75° C. while stirring.

Next, 100 g of styrene monomers into which 6 g of benzoyl peroxide and 0.75 g of t-butyl peroxybenzoate were dissolved as polymerization initiators were supplied into the 5-liter polymerization vessel, and then absorbed into the seed particles. This was held at 75° C. for 30 minutes to polymerize, and thereby a reaction liquid was obtained.

Then, while raising the temperature of the reaction liquid to 120° C. for 180 minutes, 1,400 g of styrene monomers were supplied into the polymerization vessel by a certain amount at a time for 160 minutes. Next, after raising the temperature to 120° C., the temperature was raised to 130° C. and then cooled after 2 hours had passed to obtain polystyrene-based resin particles (C).

The average particle diameter of the obtained polystyrene-based resin particles (C), the average particle diameter of the polyacrylic acid ester-based resin microparticles therein, and the absorbance ratios of the surface area and center part were measured. The results are shown in Tables 1 and 2.

(Manufacture of Expandable Particles)

Next, into another polymerization vessel with stirrer having an internal volume of 5 liters, 2,200 g of water, 1,800 g of the polystyrene-based resin particles (C), 7.2 g of magnesium pyrrolinate as a suspension stabilizer, and 0.36 g of sodium dodecylbenzene sulfonate were supplied, and the temperature was raised to 100° C. while stirring. Next, 126 g of butane (gas type b: manufactured by Cosmo Oil Co., Ltd., product name Cosmo Butane Silver) in which n-butane/iso-butane=60/40 to 70/30 was injected as a blowing agent into the 5-liter polymerization vessel and held for 3 hours to obtain expandable particles. After holding, the expandable particles were cooled to 30° C. or less, and then removed from the polymerization vessel, dried, and left to stand for five days in a 13° C. isothermal room.

(Pre-Expansion of Expandable Particles and Manufacture of Expanded Molded Article)

Pre-expanded particles and an expanded molded article were obtained from the obtained expandable particles and measured and evaluated in the same way as in Example 1. The results thereof are shown in Tables 1 and 2.

Comparative Example 2

Manufacture of Rubber-Modified Polystyrene-Based Resin Particles

Styrene-butadiene block copolymer whose butadiene content is 60% by weight was dissolved into styrene monomers to prepare a 14.5% by weight solution. To 100 parts by weight of this solution, 5 parts by weight of ethyl benzene, 0.05 parts by weight of 1,1-bis(t-butylperoxy)cyclohexane, and 0.05 parts by weight of t-dodecyl mercaptan were added to obtain a polymer starting material liquid.

Next, the obtained polymer starting material liquid was supplied into a polymerization vessel with stirrer having an internal volume of 5 liters and polymerization was carried out under the following conditions. Polymerization was carried out at a polymerization temperature of 105° C. for 3 hours, and then the temperature was raised to 130° C. for 2 hours and further raised to 145° C. for 1 hour. Subsequently, the obtained polymer liquid was sent into a devolatizer under heated vacuum to remove unreacted styrene monomers and ethyl benzene, and thereby polymers were obtained.

The obtained polymers were supplied to an extruder, kneaded, drawn into a strand from a die fine pore, and directly water-cooled. The strand was subsequently cut into pellets of approximately 1 mm in diameter and approximately 1.5 mm in length. The content of the butadiene component in the obtained pelleted rubber-modified polystyrene-based resin particles was 10.5% by weight upon calculation from a mass balance of the styrene-butadiene block copolymer and styrene.

(Manufacture of Expandable Particles)

Next, into another polymerization vessel with stirrer having an internal volume of 5 liters, 2,200 g of water, 1,800 g of the rubber-modified polystyrene-based resin particles, 7.2 g of magnesium pyrrolinate as a suspension stabilizer, and 0.36 g of sodium dodecylbenzene sulfonate were supplied, and the temperature was raised to 125° C. while stirring. Next, 144 g of pentane (gas type a: manufactured by Cosmo Oil Co., Ltd., product name Pentane) in which n-pentane/iso-pentane=75/25 to 85/15 was injected as a blowing agent into the 5-liter polymerization vessel and held for 5 hours to obtain expandable particles. After holding, the expandable particles were cooled to 30° C. or less, and then removed from the polymerization vessel, dried, and left to stand for five days in a 13° C. isothermal room.

(Pre-Expansion of Expandable Particles and Manufacture of Expanded Molded Article)

Pre-expanded particles and an expanded molded article were obtained from the obtained expandable particles and measured and evaluated in the same way as in Example 1. The results thereof are shown in Tables 1 and 2.

TABLE 1

| | | Seed Particle (Core PS) | Acrylic Acid Ester | Core PS Amt./Acrylic Acid Ester Added Amt./SM Added Amt. | Resin Particle Average Particle Diameter [mm] | Feed Gas Type | Feed Gas Added Amt. [wt %/resin particle] | Comprised Gas Amt. (immediately after extraction) [wt %/expandable particle] |
|---|---|---|---|---|---|---|---|---|
| Examples | 1 | B-1 | butyl acrylate | 25/10/65 | 1.04 | a | 10 | 7.9 |
| | 2 | B-1 | 2-ethylhexyl acrylate | 25/10/65 | 1.05 | a | 10 | 8.1 |
| | 3 | B-1 | ethyl acrylate | 25/10/65 | 1.04 | a | 10 | 7.8 |
| | 4 | B-2 | butyl acrylate | 50/20/30 | 1.30 | a | 7 | 5.7 |
| | 5 | B-2 | butyl acrylate | 50/20/30 | 1.31 | a | 7 | 6.1 |
| | 6 | B-2 | butyl acrylate | 30/20/50 | 1.55 | a | 7 | 5.9 |
| | 7 | B-1 | butyl acrylate | 25/10/65 | 1.05 | a | 9 | 7.3 |
| | 8 | B-1 | butyl acrylate | 30/20/50 | 0.95 | a | 8 | 6.4 |
| | 9 | B-1 | butyl acrylate | 30/20/50 | 0.95 | b | 7 | 6.1 |
| | 10 | B-2 | butyl acrylate | 75/10/15 | 1.12 | a | 10 | 7.3 |
| | 11 | B-2 | butyl acrylate | 75/20/5 | 1.11 | a | 10 | 8.4 |
| | 12 | B-2 | butyl acrylate | 50/20/30 | 1.30 | a | 7 | 5.2 |
| | 13 | B-1 | butyl acrylate | 15/10/75 | 0.96 | a | 8 | 6.1 |
| Comp. Ex. | 1 | B-1 | / | 25/0/75 | 1.08 | b | 7 | 5.9 |
| | 2 | polybutadiene component/polystyrene component = 10.5/89.5 | | | 1.10 | a | 8 | 6.9 |

TABLE 2

| | | Polyacrylic Acid Ester Microparticle Average Particle Diameter [nm] | absorbance ratio of particle surface area | absorbance ratio at point 30% of radius from center | Polyacrylic Acid Ester Microparticle Distribution Range: region from particle center where absorbance is 6 or more within particle [%/radius] | Evaluation of 50 Times Expanded Molded Article: falling ball impact value (JIS K7211) [cm] | amount of displacement at point of rupture by bending (JIS K7221-1) [mm] | cracking amount (JIS Z0235) [%] | mold-ability |
|---|---|---|---|---|---|---|---|---|---|
| Examples | 1 | 210 | 1.24 | 6.38 | 53 | 13.5 (Θ) | 14.1 (Θ) | 43.3 (Θ) | Θ |
| | 2 | 330 | 1.30 | 6.29 | 46 | 13.5 (Θ) | 15.8 (Θ) | 45.7 (○) | Θ |
| | 3 | 270 | 1.21 | 6.31 | 48 | 13.5 (Θ) | 12.5 (○) | 46.2 (○) | Θ |
| | 4 | 150 | 2.75 | 12.21 | 71 | 12.5 (○) | 12.1 (○) | 47.3 (○) | ○ |
| | 5 | 220 | 2.99 | 8.85 | 76 | 14.5 (Θ) | 17.1 (Θ) | 42.8 (Θ) | Θ |
| | 6 | 470 | 2.58 | 6.91 | 68 | 15.5 (Θ) | 16.1 (Θ) | 41.5 (Θ) | Θ |
| | 7 | 250 | 1.42 | 6.21 | 61 | 13.5 (Θ) | 14.5 (Θ) | 44.8 (Θ) | Θ |
| | 8 | 410 | 1.65 | 10.73 | 63 | 16.5 (Θ) | 17.3 (Θ) | 42.9 (Θ) | Θ |
| | 9 | 410 | 1.65 | 10.73 | 63 | 12.5 (○) | 12.3 (○) | 47.6 (○) | Θ |
| | 10 | 40 | 3.76 | 6.11 | 86 | 9.5 (Δ) | 10.4 (Δ) | 53.8 (Δ) | ○ |
| | 11 | 60 | 3.97 | 6.22 | 84 | 10.5 (Δ) | 10.8 (Δ) | 52.3 (Δ) | ○ |
| | 12 | 160 | 5.69 | 12.20 | 97 | 11.5 (○) | 11.3 (○) | 51.3 (Δ) | Δ |
| | 13 | 380 | 1.54 | 5.85 | 36 | 11.5 (○) | 11.8 (Δ) | 50.8 (Δ) | Θ |
| Comp. Ex. | 1 | / | / | / | / | 7.5 (X) | 8.6 (X) | 55.8 (X) | Θ |
| | 2 | polybutadiene microparticle average particle diameter 120 nm, uniform dispersion | | | | 8.5 (X) | 9.8 (X) | 55.3 (X) | Δ |

Example 14

Manufacture of Modified Particles

Into a polymerization vessel with stirrer having an internal volume of 5 liters, 2,000 g of water, 500 g of the polystyrene-based resin particles (B-1) obtained in Example 1 as seed particles, 8 g of magnesium pyrrolinate as a suspension stabilizer, and 0.4 g of sodium dodecylbenzene sulfonate as an anionic surfactant were supplied, and the temperature was raised to 75° C. while stirring.

Next, 200 g of butyl acrylate into which 0.6 g of dicumylperoxide and 10 g of polybutadiene-terminated acrylate (manufactured by Osaka Organic Chemical Industry Ltd., product name: BAC-45) were dissolved as polymerization initiators was supplied into the 5-liter polymerization vessel, and then the butyl acrylate was absorbed into the seed particles. This was held at 75° C. for 60 minutes. Subsequently, the temperature was raised to 130° C. and held for 2 hours.

Afterwards, the temperature was lowered to 75° C., and 200 g of styrene monomers in which 6.1 g of benzoyl peroxide and 0.75 g of t-butyl peroxybenzoate were dissolved as polymerization initiators was supplied into the 5-liter polymerization vessel, and then the styrene monomers were absorbed into the seed particles. This was held at 75° C. for 60 minutes to polymerize, and thereby a reaction liquid was obtained.

Next, while raising the temperature of the reaction liquid to 115° C. for 160 minutes, 1,100 g of styrene monomers were supplied into the polymerization vessel by a certain amount at a time for 120 minutes. Next, after raising the temperature to 115° C., the temperature was raised to 140° C. and then cooled after 2 hours had passed to obtain modified particles.

The average particle diameter of the obtained modified particles, the average particle diameter of the polyacrylic acid ester-based resin microparticles therein, and the absorbance ratios of the surface area and center part were measured. The results are shown in Tables 3 and 4.

(Manufacture of Expandable Particles)

Next, into another polymerization vessel with stirrer having an internal volume of 5 liters, 2,200 g of water, 1,800 g of the modified particles, 7.2 g of magnesium pyrrolinate as a suspension stabilizer, and 0.36 g of sodium dodecylbenzene sulfonate were supplied, and the temperature was raised to 125° C. while stirring. Next, 144 g of pentane (gas type a: manufactured by Cosmo Oil Co., Ltd., product name Pentane) in which n-pentane/iso-pentane=75/25 to 85/15 was injected as a blowing agent into the 5-liter polymerization vessel and held for 3 hours to obtain expandable particles. After holding, the expandable particles were cooled to 20° C. or less, and then removed from the polymerization vessel, dried, and left to stand for five days in a 13° C. isothermal room.

(Pre-Expansion of Expandable Particles and Manufacture of Expanded Molded Article)

Figure 4:
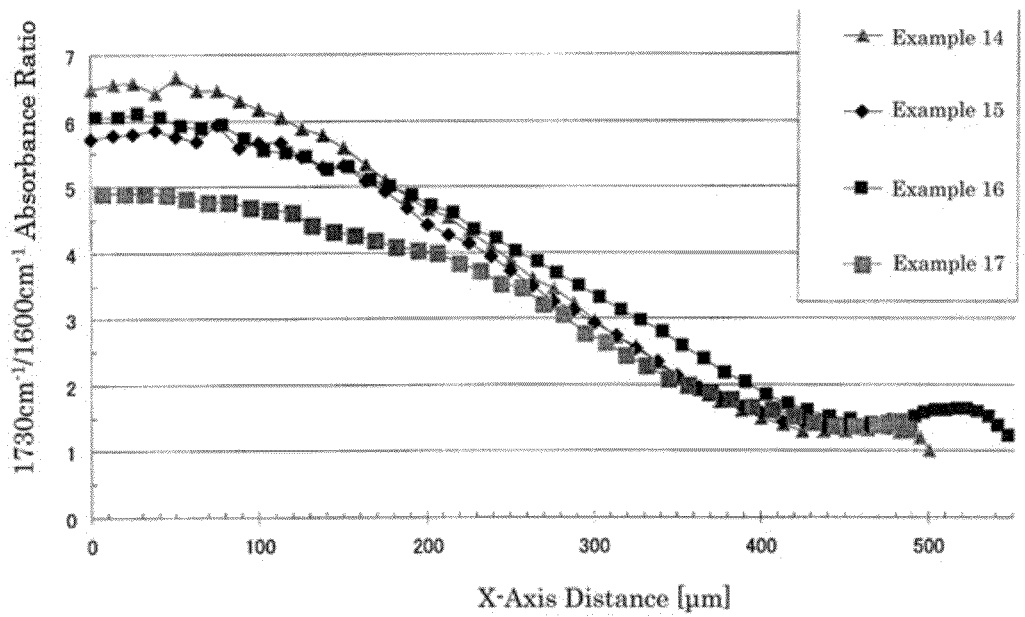
FIG. 4 is a graph showing the relationship between the distance from the center and the absorbance ratio in the modified polystyrene-based particles.

Pre-expanded particles and an expanded molded article were obtained from the obtained expandable particles and measured and evaluated in the same way as in Example 1. The results thereof are shown in Tables 3 and 4. Also, the relationship (the distribution state in a polybutyl acrylate cross-section) between the distance from the center of the modified particles and the absorbance ratio is shown in FIG. 4.

Example 15

Modified particles, expandable particles, pre-expanded particles, and an expanded molded article were obtained, measured, and evaluated in the same way as in Example 14, except that in the manufacture of the modified particles, the amount of polybutadiene-terminated acrylate was changed from 10 g to 16 g. The results thereof are shown in Tables 3 and 4. Also, the relationship (the distribution state in a polybutyl acrylate cross-section) between the distance from the center of the modified particles and the absorbance ratio is shown in FIG. 4.

Example 16

Modified particles, expandable particles, pre-expanded particles, and an expanded molded article were obtained, measured, and evaluated in the same way as in Example 14, except that in the manufacture of the modified particles, the amount of polybutadiene-terminated acrylate was changed from 10 g to 20 g. The results thereof are shown in Tables 3 and 4. Also, the relationship (the distribution state in a polybutyl acrylate cross-section) between the distance from the center of the modified particles and the absorbance ratio is shown in FIG. 4.

Example 17

Modified particles, expandable particles, pre-expanded particles, and an expanded molded article were obtained, measured, and evaluated in the same way as in Example 14, except that in the manufacture of the modified particles, the amount of polybutadiene-terminated acrylate was changed from 10 g to 40 g. The results thereof are shown in Tables 3 and 4. Also, the relationship (the distribution state in a polybutyl acrylate cross-section) between the distance from the center of the modified particles and the absorbance ratio is shown in FIG. 4.

area indicates a region from the center out to 30% of the radius. The method for confirming the distribution state is described below.

The modified resin articles are embedded in an epoxy resin, and the epoxy resin comprising the modified resin particles is processed using an ultramicrotome (manufactured by Leica Microsystems, LEICA ULTRACUT UCT) to yield an ultrathin section. A cross-section thereof is stained with ruthenium tetroxide.

Next, the stained section is made into an ultrathin section, placed on a grid of a microscope, and then the distribution state in the surface area region and the inner area of the polyacrylic acid ester-based resin microparticles is photographed at 10,000 times magnification with a transmission electron microscope (manufactured by Hitachi High-Technologies, Inc., H-7600).

The TEM photograph is binarized using image processing software (NanoHunter NS2K-Pro from Nano System Corp.), and the obtained binarized image is analyzed to calculate the number and surface area of the microparticles.

TABLE 3

|  |  | Seed Particle (Core PS) | Acrylic Acid Ester | Core PS Amt./Acrylic Acid Ester Added Amt./SM Added Amt. | Polybutadiene-Terminated Acrylate Added Amt. [parts by mass] | Resin Particle Average Particle Diameter [mm] | Feed Gas Type | Added Amt. [wt %/resin particle] | Comprised Gas Amt. (immediately after extraction) [wt %/expandable particle] |
|---|---|---|---|---|---|---|---|---|---|
| Examples | 14 | B-1 | butyl acrylate | 25/10/65 | 0.05 | 1.08 | a | 8 | 6.2 |
|  | 15 | B-1 | butyl acrylate | 25/10/65 | 0.08 | 1.07 | a | 8 | 6.4 |
|  | 16 | B-1 | butyl acrylate | 25/10/65 | 0.10 | 1.04 | a | 8 | 6.3 |
|  | 17 | B-1 | butyl acrylate | 25/10/65 | 0.20 | 1.05 | a | 8 | 6.1 |

TABLE 4

|  |  | Polyacrylic Acid Ester Microparticle Distribution Range | | | | Evaluation of 50 Times Expanded Molded Article | | | |
|---|---|---|---|---|---|---|---|---|---|
|  |  | Polyacrylic Acid Ester Microparticle Average Particle Diameter | absorbance ratio of particle surface area | absorbance ratio at point 30% of radius from center | region from particle center where absorbance is 4 or more within particle [%/radius] | region from particle center where absorbance is 6 or more within particle [%/radius] | falling ball impact value (JIS K7211) [cm] | amount of displacement at point of rupture by bending (JIS K7221-1) [mm] | cracking amount (JIS Z0235) [%] | mold-ability |
| Examples | 14 | 270 | 1.03 | 5.33 | 48 | 23 | 19.5 (Θ) | 19.8 (Θ) | 40.9 (Θ) | Θ |
|  | 15 | 280 | 1.23 | 5.08 | 45 | 0 | 17.5 (Θ) | 17.8 (Θ) | 41.9 (Θ) | Θ |
|  | 16 | 270 | 1.11 | 5.11 | 51 | 8 | 16.5 (Θ) | 17.9 (Θ) | 42.0 (Θ) | Θ |
|  | 17 | 260 | 1.88 | 4.19 | 39 | 0 | 18.5 (Θ) | 17.4 (Θ) | 41.8 (Θ) | Θ |

Example 18

For the 10 particles shown in Table 5 among Examples 1 to 17, the distribution state in the surface area region and the inner area of the polyacrylic acid ester-based resin microparticles was confirmed. The surface area indicates a region from the particle surface down to a depth of 20 μm, and the inner The processing for calculating the number and surface area of the microparticles using the image processing software is carried out under the following conditions:

(1) Scale Setting (when the measurement magnification is 10,000 times, the scale bar length=100 nm, and "scale value=1.852 nm/pixel")

(2) Region Setting (when image processing the surface area region, the region is set so as not to comprise the interface between the modified particles and the epoxy resin)

(3) Smoothing Filter (filter size: 3×3, 8 neighborhoods, number of processes: 1 time)

(4) NS Binarization (darker than background, noise removal, concentration range=0 to 255)

(5) Hole Plugging (6) Selection of Only Images by Amount of Features (Surface Area) (from 100.0 to nm$^2$ (small objects of less than 100.00 nm$^2$ surface area are removed), 8 neighborhoods)

(7) Surface Area Measurement (8 neighborhoods).

The binzarization is performed while adjusting the definition and sensitivity so that the black parts around the microparticles (interface between the polystyrene-based resin and the microparticles) become the boundary between the white regions and the black regions in the TEM photograph.

The number and area ratio of the microparticles in the inner area and surface area region of the 10 particles are shown in Table 5. Table 5 also shows the definition and sensitivity during binarization.

TABLE 5

| Particle No. | Example | Surface area | | | | Inner area | | | | Inner area/Surface area | |
|---|---|---|---|---|---|---|---|---|---|---|---|
| | | micro-particle no. (no.) | micro-particle area ratio (%) | definition | sensitivity | micro-particle no. (no.) | micro-particle area ratio (%) | definition | sensitivity | no. ratio | area ratio |
| 1 | 14 | 51 | 5.024 | 195 | 5 | 107 | 15.373 | 170 | 6 | 2.10 | 3.06 |
| 2 | 15 | 159 | 8.763 | 195 | 5 | 103 | 11.637 | 170 | 6 | 0.65 | 1.33 |
| 3 | 16 | 79 | 2.504 | 195 | 5 | 59 | 16.052 | 170 | 6 | 0.75 | 6.41 |
| 4 | 7 | 15 | 1.721 | 195 | 5 | 79 | 18.622 | 170 | 6 | 5.27 | 10.82 |
| 5 | 17 | 83 | 4.458 | 195 | 5 | 143 | 28.542 | 170 | 6 | 1.72 | 6.40 |
| 6 | 13 | 48 | 10.247 | 195 | 5 | 73 | 20.796 | 170 | 9 | 1.52 | 2.03 |
| 7 | 8 | 90 | 6.253 | 195 | 5 | 118 | 42.461 | 170 | 9 | 1.31 | 6.79 |
| 8 | 9 | 73 | 2.518 | 195 | 5 | 107 | 29.529 | 170 | 7 | 1.47 | 11.73 |
| 9 | 5 | 49 | 4.428 | 170 | 5 | 149 | 37.614 | 170 | 10 | 3.04 | 8.49 |
| 10 | 6 | 14 | 3.922 | 150 | 5 | 103 | 28.241 | 170 | 6 | 7.36 | 7.20 |

Figure 5:
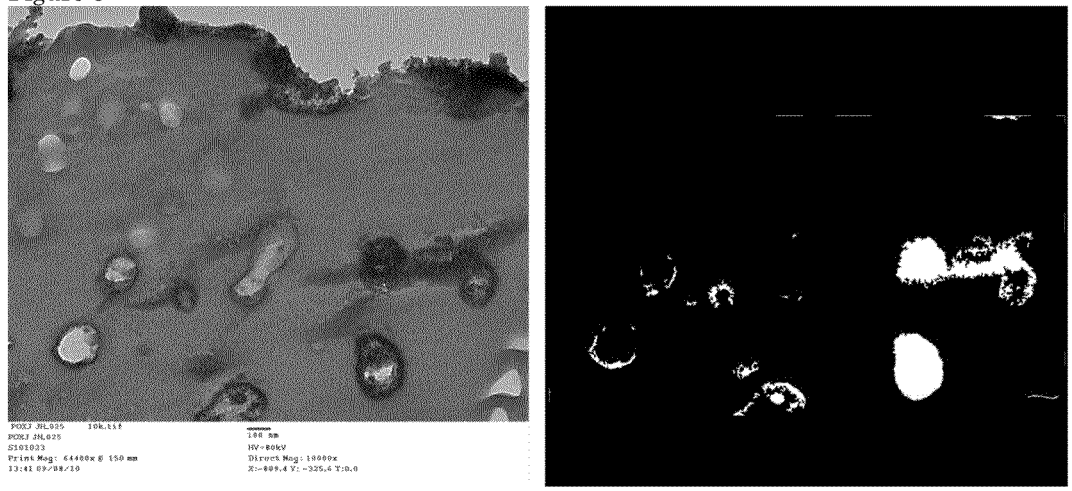
FIG. 5 is a TEM photograph and a binarized image thereof of a surface area of the modified polystyrene-based particles of Example 18.
Figure 6:
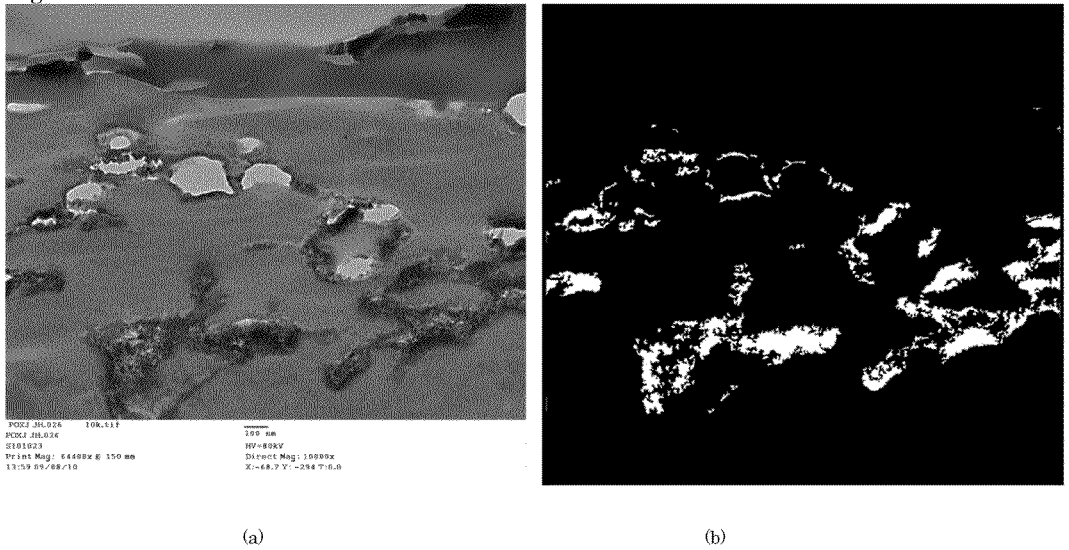
FIG. 6 is a TEM photograph and a binarized image thereof of a surface area of the modified polystyrene-based particles of Example 18.
Figure 7:
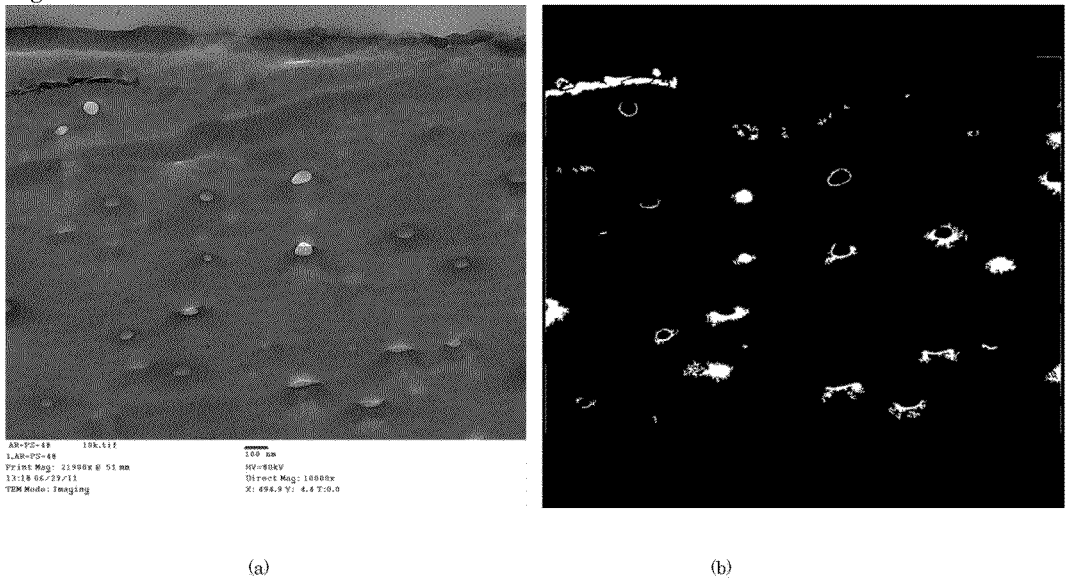
FIG. 7 is a TEM photograph and a binarized image thereof of a surface area of the modified polystyrene-based particles of Example 18.
Figure 8:
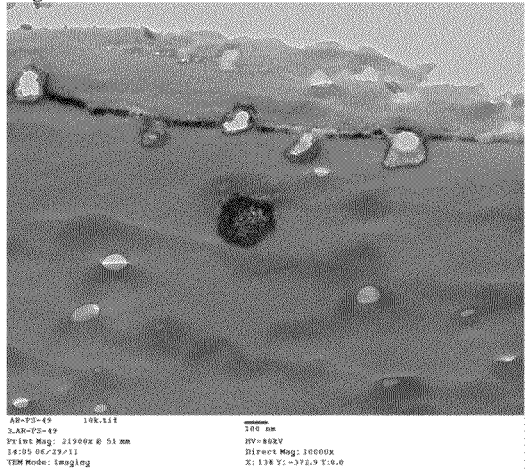
FIG. 8 is a TEM photograph and a binarized image thereof of a surface area of the modified polystyrene-based particles of Example 18.
Figure 8:
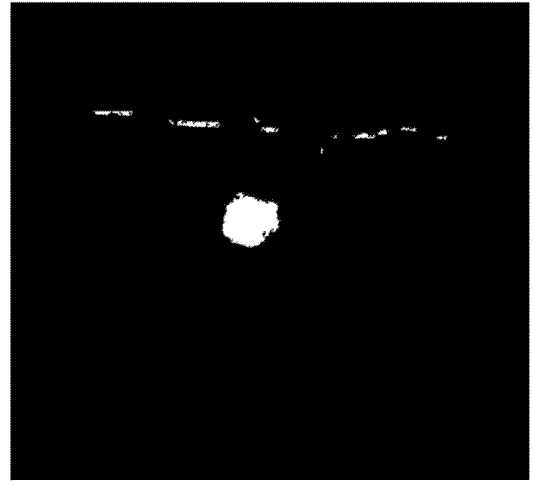
Figure 9:
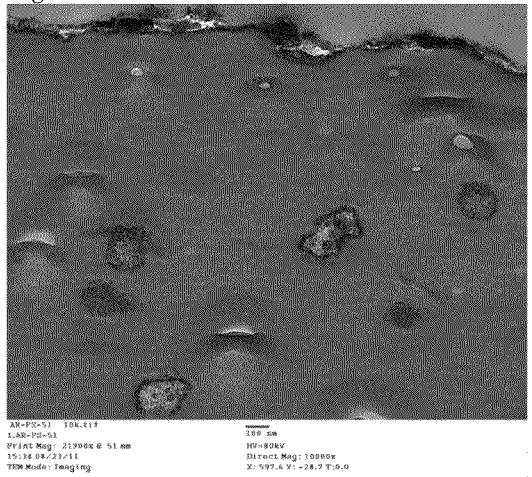
FIG. 9 is a TEM photograph and a binarized image thereof of a surface area of the modified polystyrene-based particles of Example 18.
Figure 9:
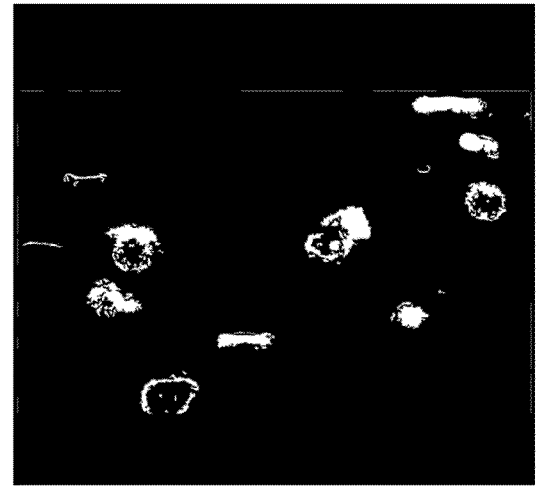
Figure 10:
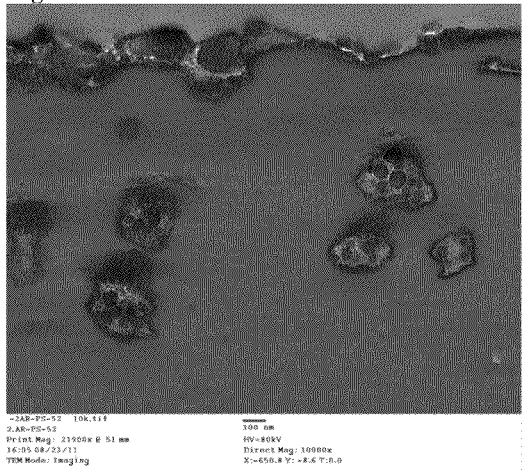
FIG. 10 is a TEM photograph and a binarized image thereof of a surface area of the modified polystyrene-based particles of Example 18.
Figure 10:
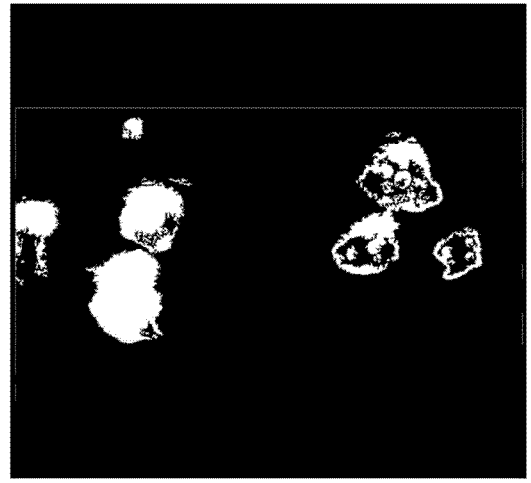
Figure 11:
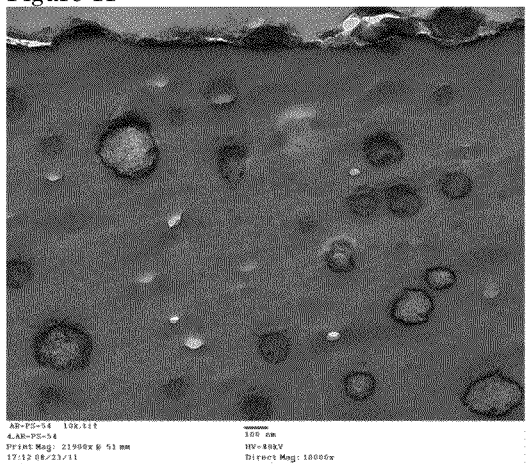
FIG. 11 is a TEM photograph and a binarized image thereof of a surface area of the modified polystyrene-based particles of Example 18.
Figure 11:
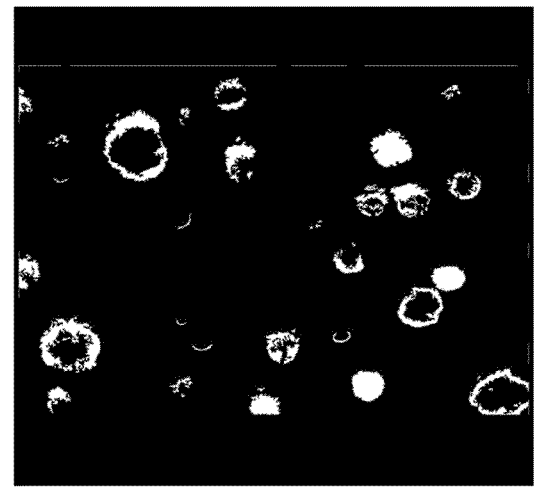
Figure 12:
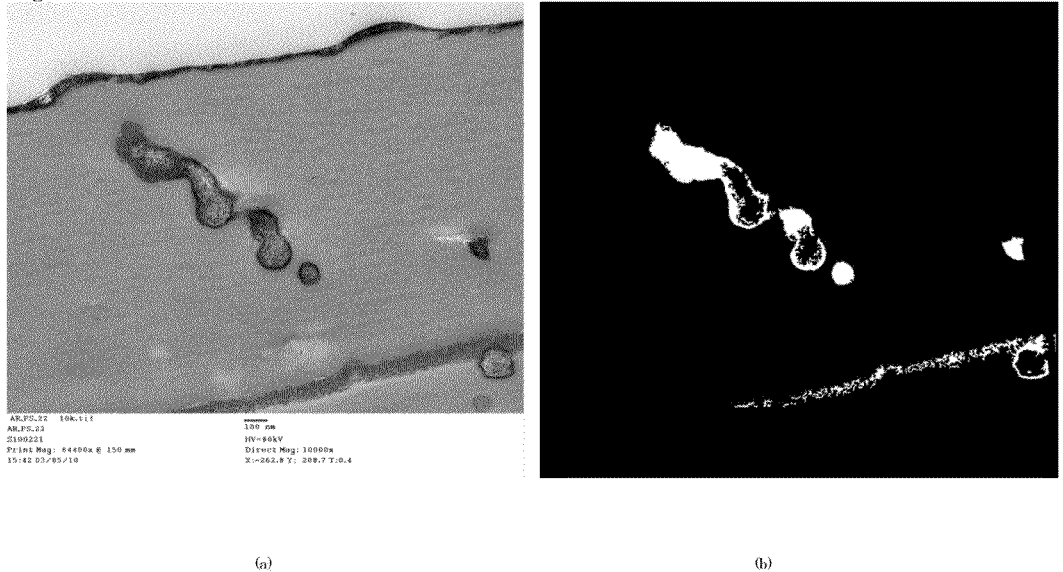
FIG. 12 is a TEM photograph and a binarized image thereof of a surface area of the modified polystyrene-based particles of Example 18.
Figure 13:
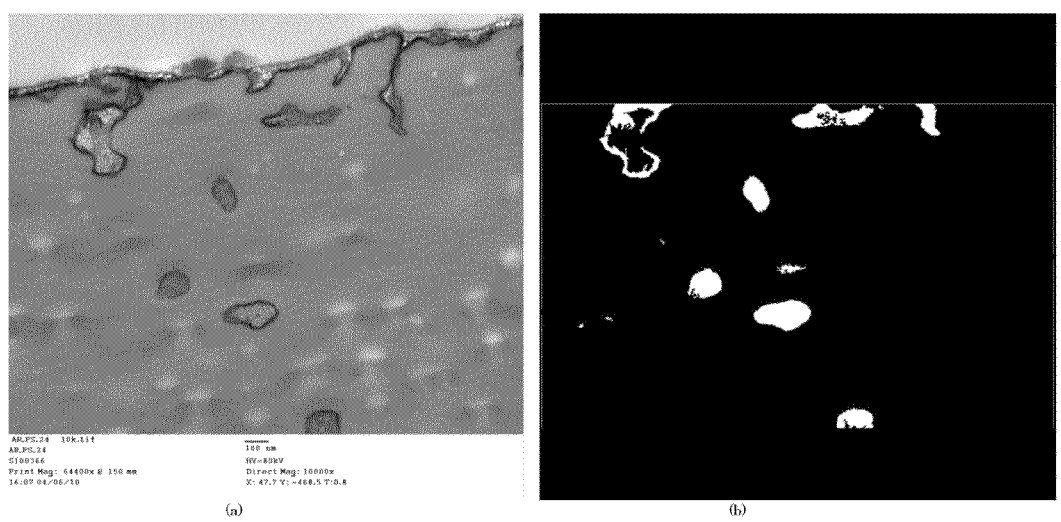
FIG. 13 is a TEM photograph and a binarized image thereof of a surface area of the modified polystyrene-based particles of Example 18.
Figure 14:
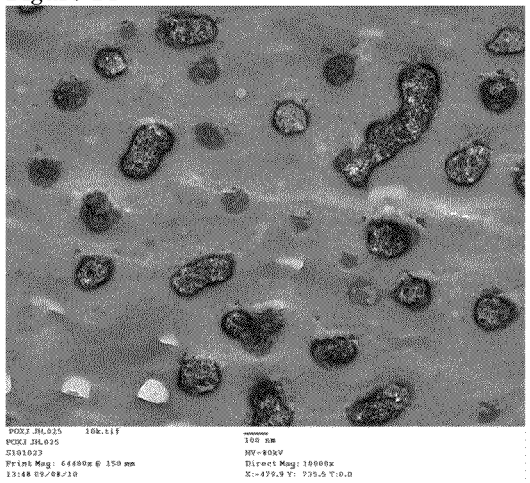
FIG. 14 is a TEM photograph and a binarized image thereof of an inner area of the modified polystyrene-based particles of Example 18.
Figure 14:
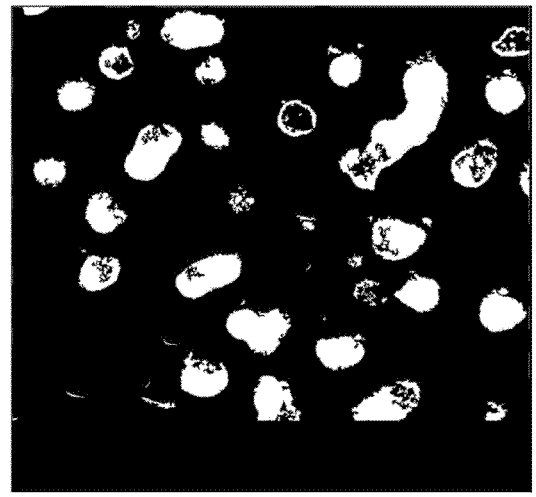
Figure 15:
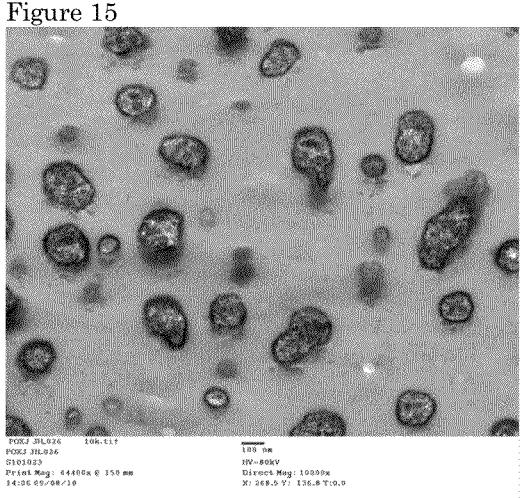
FIG. 15 is a TEM photograph and a binarized image thereof of an inner area of the modified polystyrene-based particles of Example 18.
Figure 15:
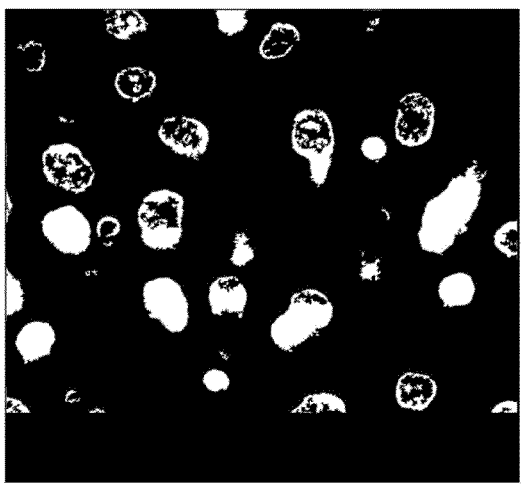
Figure 16:
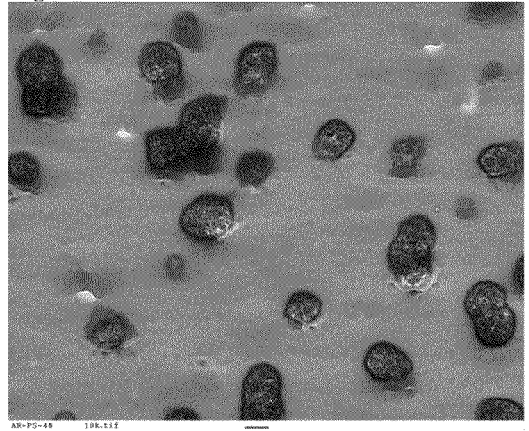
FIG. 16 is a TEM photograph and a binarized image thereof of an inner area of the modified polystyrene-based particles of Example 18.
Figure 16:
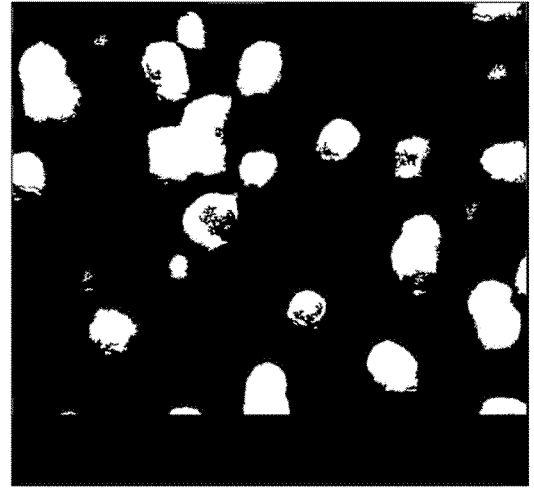
Figure 17:
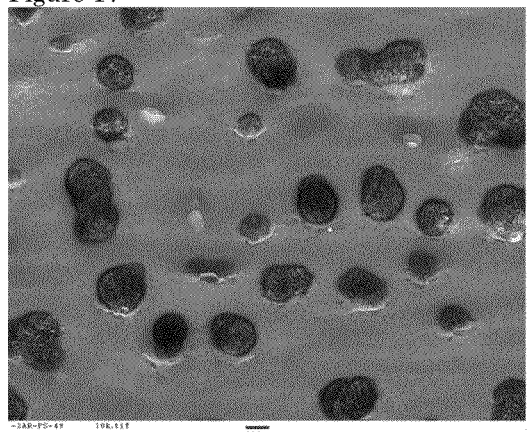
FIG. 17 is a TEM photograph and a binarized image thereof of an inner area of the modified polystyrene-based particles of Example 18.
Figure 17:
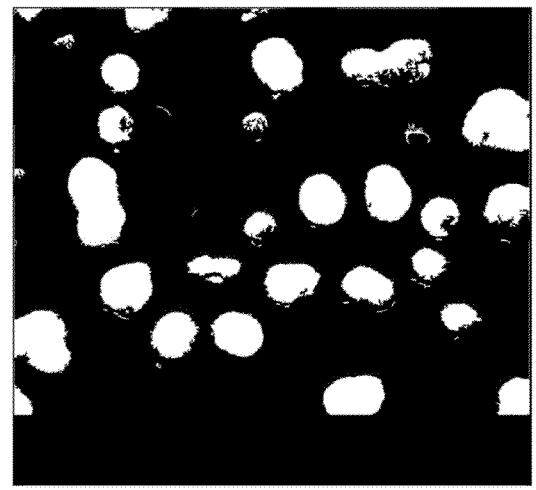
Figure 18:
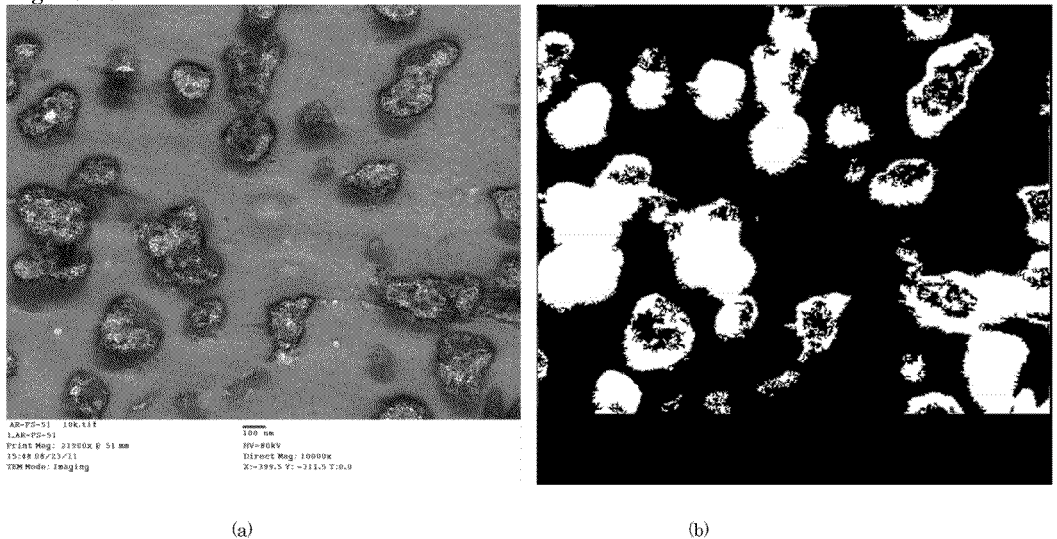
FIG. 18 is a TEM photograph and a binarized image thereof of an inner area of the modified polystyrene-based particles of Example 18.
Figure 19:
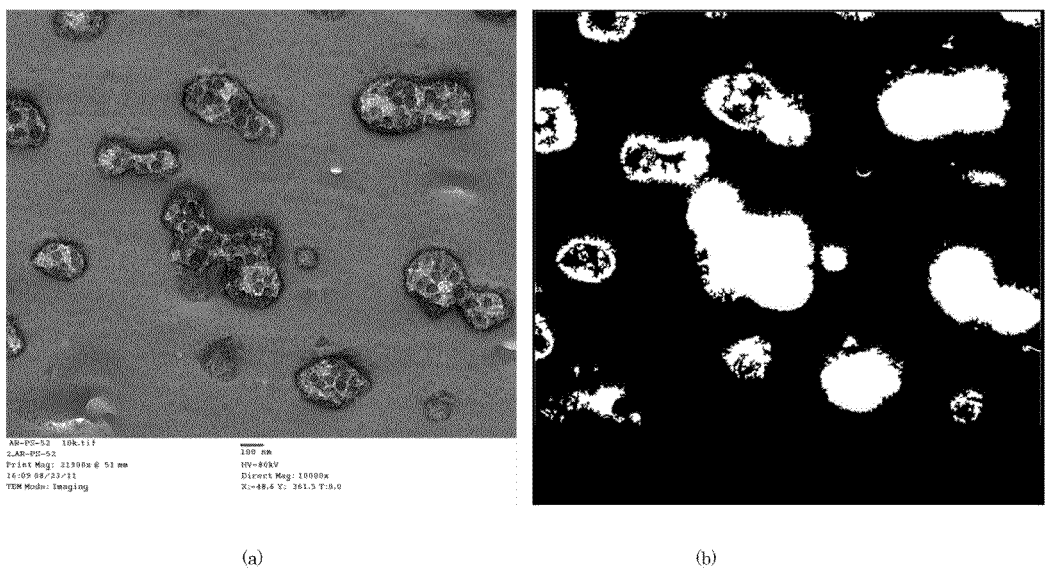
FIG. 19 is a TEM photograph and a binarized image thereof of an inner area of the modified polystyrene-based particles of Example 18.
Figure 20:
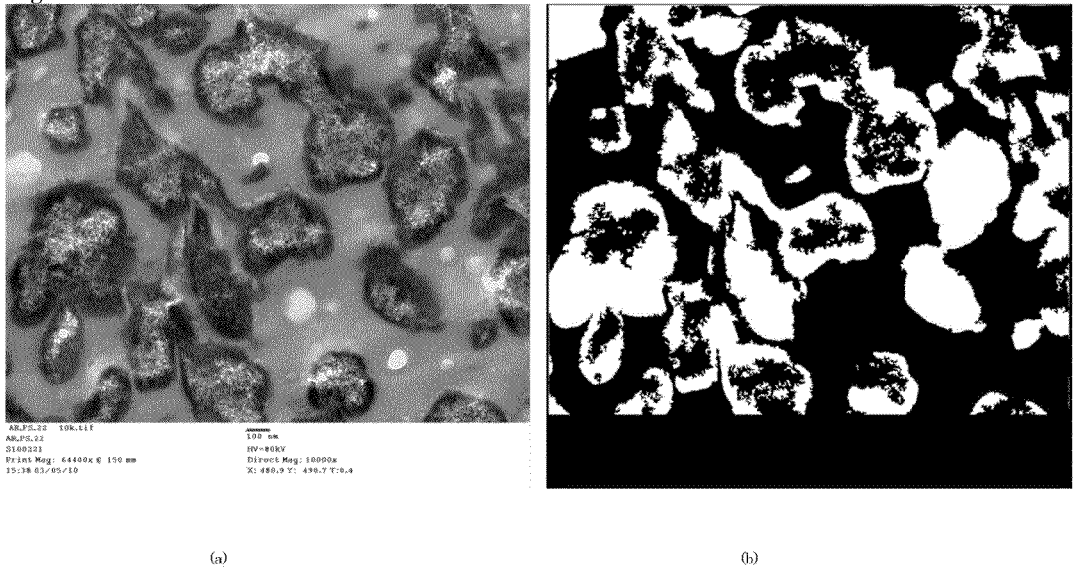
FIG. 20 is a TEM photograph and a binarized image thereof of an inner area of the modified polystyrene-based particles of Example 18.
Figure 21:
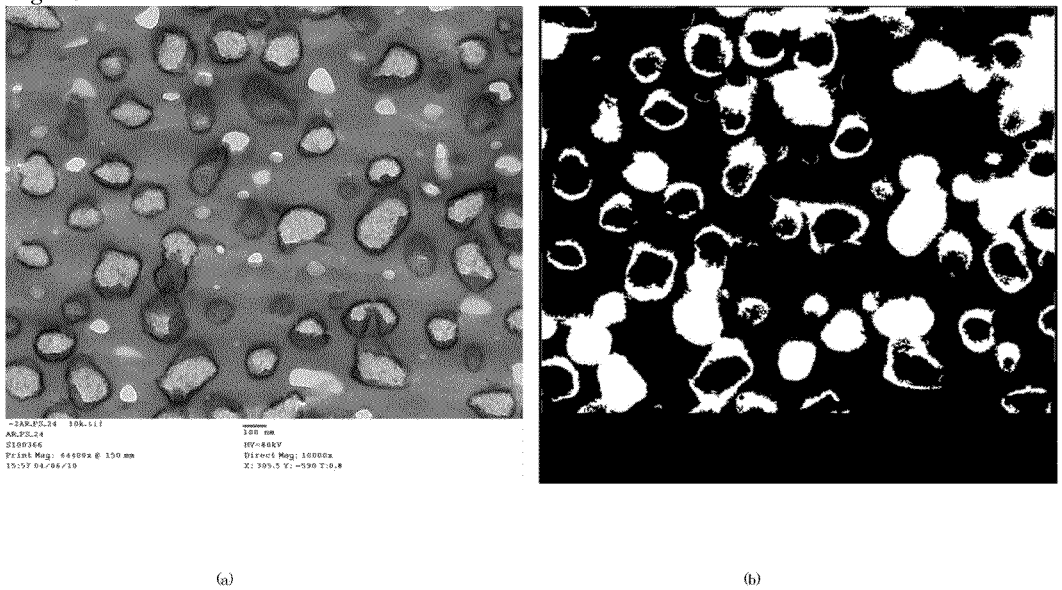
FIG. 21 is a TEM photograph and a binarized image thereof of an inner area of the modified polystyrene-based particles of Example 18.

TEM photographs of the surface area of Particles 1 to 7 and 9 to 10 are shown in FIGS. 5(*a*) to 13(*a*), and binarized images of the TEM photographs are shown in FIGS. 5(*b*) to 13(*b*). TEM photographs of the inner area of Particles 1 to 6 and 9 to 10 are shown in FIGS. 14(*a*) to 21(*a*), and binarized images of the TEM photographs are shown in FIGS. 14(*b*) to 21(*b*).

From the above tables and the drawings, it can be understood that in all of the modified particles of the examples, the polyacrylic acid ester-based resin microparticles exist in the surface area and the inner area in an area ratio of a specific range. Further, it can be understood that the microparticles are more concentrated in the inner area than in the surface area.

What is claimed is:

1. Modified polystyrene-based resin particles comprising polyacrylic acid ester-based resin microparticles having an average particle diameter in the range of from 30 to 1,000 nm being dispersed therein, wherein said polyacrylic acid ester-based resin microparticles
   (1) are present in an area ratio of from 0.1 to 15% in a surface region, which includes depths up to 20 um from the surface of each resin particle, and
   (2) are present in an area ratio of from 11 to 50% in an inner region, which includes depths between the center of each resin particle and a depth 30% of the radius from the center of each resin particle;
   wherein the modified polystyrene-based resin particles have an average particle diameter in the range of from 0.3 to 2 mm; and
   wherein the modified polystyrene-based resin particles contain a component derived from acrylate-terminated polybutadiene.

2. The modified polystyrene-based resin particles according to claim 1, wherein the area ratio of the inner region is 1.1 to 100 times larger than the area ratio of the surface region.

3. The modified polystyrene-based resin particles according to claim 1, wherein
   (1) an absorbance ratio (D1730/D1600) of the surface region is 2 or more less than the absorbance ratio (D1730/D1600) of the inner region (D1730 and D1600 refer to an absorbance at 1730 cm$^{-1}$ and an absorbance at 1600 cm$^{-1}$ on the infrared absorption spectrum by infrared spectroscopic analysis), and
   (2) an absorbance ratio (D1730/D1600) of the entirety of the inner region is 4 or more.

4. The modified polystyrene-based resin particles according to claim 3, comprising at least, a region where the absorbance ratio (D1730/D1600) is 4 or more throughout a region between a depth that is 30% of the radius from the center of each resin particle and a depth that is 98% of the radius from the center of each resin particle.

5. The modified polystyrene-based resin particles according to claim 1, wherein
   (1) an absorbance ratio (D1730/D1600) of the surface region is less than 6 (D1730 and D1600 refer to an absorbance at 1730 cm$^{-1}$ and an absorbance at 1600 cm$^{-1}$ on the infrared absorption spectrum by infrared spectroscopic analysis); and
   (2) an absorbance ratio (D1730/D1600) of the entirety of the inner region is 6 or more.

6. The modified polystyrene-based resin particles according to claim 5, comprising a region where the absorbance ratio (D1730/D1600) is 6 or more between a depth that is 30% of the radius from the center of each resin particle and a depth that is 98% of the radius from the center of each resin particle.

7. The modified polystyrene-based resin particles according to claim 1, comprising the polyacrylic acid ester-based resin microparticles being formed by polymers of ethyl acrylate, butyl acrylate, 2-ethylhexyl acrylate, or a mixture thereof.

8. The modified polystyrene-based resin particles according to claim 1, comprising the polyacrylic acid ester-based resin microparticles having an average particle diameter in the range of from 200 to 500 nm.

9. The modified polystyrene-based resin particles according to claim 1, wherein
  (1) an absorbance ratio (D1730/D1600) of the surface region is 3 or less, and
  (2) an absorbance ratio (D1730/D1600) of a region between a depth that is 30% of the radius from the center of each resin particle and a depth that is 90% of the radius from the center of each resin particle is 6 or more;
  wherein D1730 and D1600 refer to an absorbance at 1730 cm$^{-1}$ and an absorbance at 1600 cm$^{-1}$ on the infrared absorption spectrum by infrared spectroscopic analysis.

10. The modified polystyrene-based resin particles according to claim 1, wherein
  (1) an absorbance ratio (D1730/D1600) of the surface region is 3 or less, and
  (2) an absorbance ratio (D1730/D1600) of a region between a depth that is 30% of the radius from the center of each resin particle and a depth that is 50% of the radius from the center of each resin particle is 6 or more;
  wherein D1730 and D1600 refer to an absorbance at 1730 cm$^{-1}$ and an absorbance at 1600 cm$^{-1}$ on the infrared absorption spectrum by infrared spectroscopic analysis.

11. Expandable particles comprising the modified polystyrene-based resin particles according to claim 1 and a volatile blowing agent.

12. The expandable particles according to claim 11, wherein the volatile blowing agent is a volatile blowing agent having pentane as a main component, and the content thereof is from 2 to 10% by weight relative to the expandable polystyrene-based resin particles.

13. Pre-expanded particles obtained by pre-expanding the expandable particles according to claim 12.

14. An expanded molded article obtained by expanding and molding the pre-expanded particles according to claim 13.

15. A method for manufacturing the modified polystyrene-based resin particles according to claim 1, comprising the following steps:
  at least impregnating in an aqueous medium the seed particles of polystyrene-based resin with acrylic acid ester-based monomer, and then
  having said acrylic acid ester-based monomer polymerized,
  thereby to have the microparticles of polyacrylic acid ester-based resin formed and dispersed in said seed particles;
  and subsequently in said aqueous medium
  at least impregnating styrene-based monomer into the seed particles, in which said microparticles of polyacrylic acid ester-based resin are formed and dispersed, and then having the styrene-based monomer polymerized, thereby to grow the polystyrene-based resin particles.

16. The method for manufacturing the modified polystyrene-based resin particles according to claim 15 comprising a component derived from acrylate-terminated polybutadiene contained, wherein said component derived from acrylate-terminated polybutadiene is formed by (way of) having acrylate-terminated polybutadiene absorbed and polymerized together with the acrylic acid ester-based monomer in said modified polystyrene-based resin particles.

17. A method of manufacturing the expandable particles according to claim 11, comprising the following steps:
  at least impregnating in an aqueous medium the seed particles of polystyrene-based resin with acrylic acid ester-based monomer, and then
  having said acrylic acid ester-based monomer polymerized,
  thereby to have the microparticles of polyacrylic acid ester-based resin formed and dispersed in said seed particles;
  and subsequently in said aqueous medium
  at least impregnating styrene-based monomer into the seed particles, in which said microparticles of polyacrylic acid ester-based resin are formed and dispersed, and then having the styrene-based monomer polymerized,
  thereby to grow the polystyrene-based resin particles,
  impregnating said polystyrene-based resin particles with a volatile blowing agent either after or during the step of growing the polystyrene-based resin particles.

18. The method of manufacturing the expandable particles according to claim 17 comprising a component derived from polybutadiene-terminated acrylate contained in the modified polystyrene-based resin particles, wherein said component derived from polybutadiene-terminated acrylate is formed by (way of) having polybutadiene-terminated acrylate absorbed and polymerized together with the acrylic acid ester-based monomer in said modified polystyrene-based resin particles.

19. Modified polystyrene-based resin particles comprising polyacrylic acid ester-based resin microparticles having an average particle diameter in the range of from 30 to 1,000 nm being dispersed therein, wherein said polyacrylic acid ester-based resin microparticles
  (1) are present in an area ratio of from 0.1 to 15% in a surface region, which includes depths up to 20 um from the surface of each resin particle, and
  (2) are present in an area ratio of from 11 to 50% in an inner region, which includes depths between the center of each resin particle and a depth 30% of the radius from the center of each resin particle;
  wherein
  (1) an absorbance ratio (D1730/D1600) of the surface region is less than 6 (D1730 and D1600 refer to an absorbance at 1730 cm$^{-1}$ and an absorbance at 1600 cm$^{-1}$ on the infrared absorption spectrum by infrared spectroscopic analysis); and
  (2) an absorbance ratio (D1730/D1600) of the entirety of the inner region is 6 or more; and
  wherein the modified polystyrene-based resin particles comprising a region where the absorbance ratio (D1730/D1600) is 6 or more between a depth that is 30% of the radius from the center of each resin particle and a depth that is 98% of the radius from the center of each resin particle wherein the modified polystyrene-resin based particles contain a component derived from acrylate-terminated polybutadiene.

20. Modified polystyrene-based resin particles comprising polyacrylic acid ester-based resin microparticles having an average particle diameter in the range of from 30 to 1,000 nm being dispersed therein,
  wherein
  (1) an absorbance ratio (D1730/D1600) of a surface region is less than 6 (D1730 and D1600 refer to an absorbance at 1730 cm$^{-1}$ and an absorbance at 1600 cm$^{-1}$ on the infrared absorption spectrum by infrared spectroscopic analysis); and
  (2) an absorbance ratio (D1730/D1600) is 6 or more at least in the entire region between the center of each resin particle and a depth 30% of the radius from the center of each resin particle; and
  wherein the modified polystyrene-based resin particles comprise a region where the absorbance ratio (D1730/D1600) is 6 or more being present between a depth that is 30% of the radius from the center of each resin particle and a depth that is 98% of the radius from the center of each resin particle, and the modified polystyrene-based resin particles have an average particle diameter in the range of from 0.3 mm to 2 mm wherein the modified polystyrene-resin based particles contain a component derived from acrylate-terminated polybutadiene.

* * * * *

UNITED STATES PATENT AND TRADEMARK OFFICE
CERTIFICATE OF CORRECTION

PATENT NO.        : 9,127,148 B2
APPLICATION NO.   : 13/876239
DATED             : September 8, 2015
INVENTOR(S)       : Y. Tsutsui et al.

Page 1 of 1

It is certified that error appears in the above-identified patent and that said Letters Patent is hereby corrected as shown below:

In the Claims

Column 36, line 21 (claim 4, line 2) please change "at least, a" to -- at least a --

Signed and Sealed this
Twenty-eighth Day of June, 2016

Michelle K. Lee
*Director of the United States Patent and Trademark Office*